(12) United States Patent
Kinoshita et al.

(10) Patent No.: US 11,565,889 B2
(45) Date of Patent: Jan. 31, 2023

(54) FEEDER AND ROBOT SYSTEM

(71) Applicant: Seiko Epson Corporation, Tokyo (JP)

(72) Inventors: Toyotaro Kinoshita, Azumino (JP); Hirohisa Umeda, Azumino (JP); Yuki Yahiro, Shenzhen (CN); Yoshitake Kobayashi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 342 days.

(21) Appl. No.: 16/886,885

(22) Filed: May 29, 2020

(65) Prior Publication Data

US 2020/0377307 A1 Dec. 3, 2020

(30) Foreign Application Priority Data

May 30, 2019 (JP) .............................. JP2019-101036

(51) Int. Cl.
| | |
|---|---|
| *B65G 27/16* | (2006.01) |
| *B65G 47/26* | (2006.01) |
| *B65G 27/04* | (2006.01) |
| *B25J 9/00* | (2006.01) |
| *B25J 9/16* | (2006.01) |
| *B25J 19/02* | (2006.01) |
| *B25J 15/06* | (2006.01) |

(52) U.S. Cl.
CPC ............ *B65G 47/26* (2013.01); *B25J 9/0018* (2013.01); *B25J 9/0081* (2013.01); *B25J 9/1697* (2013.01); *B25J 15/0616* (2013.01); *B25J 19/023* (2013.01); *B65G 27/04* (2013.01); *B65G 2203/0266* (2013.01); *B65G 2203/041* (2013.01); *B65G 2812/0308* (2013.01)

(58) Field of Classification Search
CPC .......... B65G 27/16; B65G 54/02; B64D 9/00
USPC ...................................................... 198/751.1
See application file for complete search history.

(56) References Cited

U.S. PATENT DOCUMENTS 6,488,141 B2 * 12/2002 Pritchard ............... B65G 27/04
198/771
7,104,394 B2 * 9/2006 Baird ..................... B65G 27/24
198/769

(Continued)

FOREIGN PATENT DOCUMENTS

JP 2012-254864 A 12/2012

OTHER PUBLICATIONS

Asycube Series, 3-Axes Vibration Intelligent Parts Feeding System, Asyril, Experts in Flexible Feeding Systems, Asyril SA, Euro Far East Co., Ltd. (Dec. 2017)—Pamphlet, with English translation (7 pages).

(Continued)

*Primary Examiner* — Douglas A Hess
(74) *Attorney, Agent, or Firm* — Yu Gang

(57) ABSTRACT

A feeder that feeds objects to be picked up by a robot, includes an object container unit having a first planar portion including a first planar surface in which the objects are thrown, and a groove portion including a plurality of grooves extending in a first direction from the first planar portion as seen from a normal direction in which a normal of the first planar surface extends, and a vibrator unit that applies vibration to the object container unit, wherein the vibrator unit has a first vibration mode in which the objects are moved in the first direction.

9 Claims, 17 Drawing Sheets

(56) References Cited

U.S. PATENT DOCUMENTS

| | | | | |
|---|---|---|---|---|
| 7,980,381 B2* | 7/2011 | Trejo | ................... | B65G 47/88 |
| | | | | 198/444 |
| 8,550,233 B2* | 10/2013 | Perroud | ................ | B65G 27/34 |
| | | | | 198/760 |
| 8,960,414 B2* | 2/2015 | Bassani | ................. | B65G 27/08 |
| | | | | 198/758 |
| 8,985,305 B2* | 3/2015 | Wong | ................ | B65G 47/1421 |
| | | | | 198/398 |
| 9,409,719 B2* | 8/2016 | Sube | ..................... | B65G 27/24 |
| 10,752,391 B2* | 8/2020 | Takeuchi | ............... | B65G 47/14 |
| 10,858,200 B1* | 12/2020 | Lin | ..................... | B65G 47/244 |
| 10,894,316 B2* | 1/2021 | Kinoshita | .......... | G05B 19/4182 |
| 10,946,415 B2* | 3/2021 | Strobel | .................... | B07B 1/42 |
| 10,974,907 B2* | 4/2021 | Olmstead | ............... | B65G 27/12 |
| 11,046,528 B2* | 6/2021 | Olmstead | ............... | B65G 27/34 |
| 11,365,061 B2* | 6/2022 | Luckas | ................. | B65G 27/32 |

OTHER PUBLICATIONS

Asycube Series, 3-Axes Vibration Intelligent Parts Feeding System, Asyril, Experts in Flexible Feeding Systems, with English translation (4 pages).

* cited by examiner

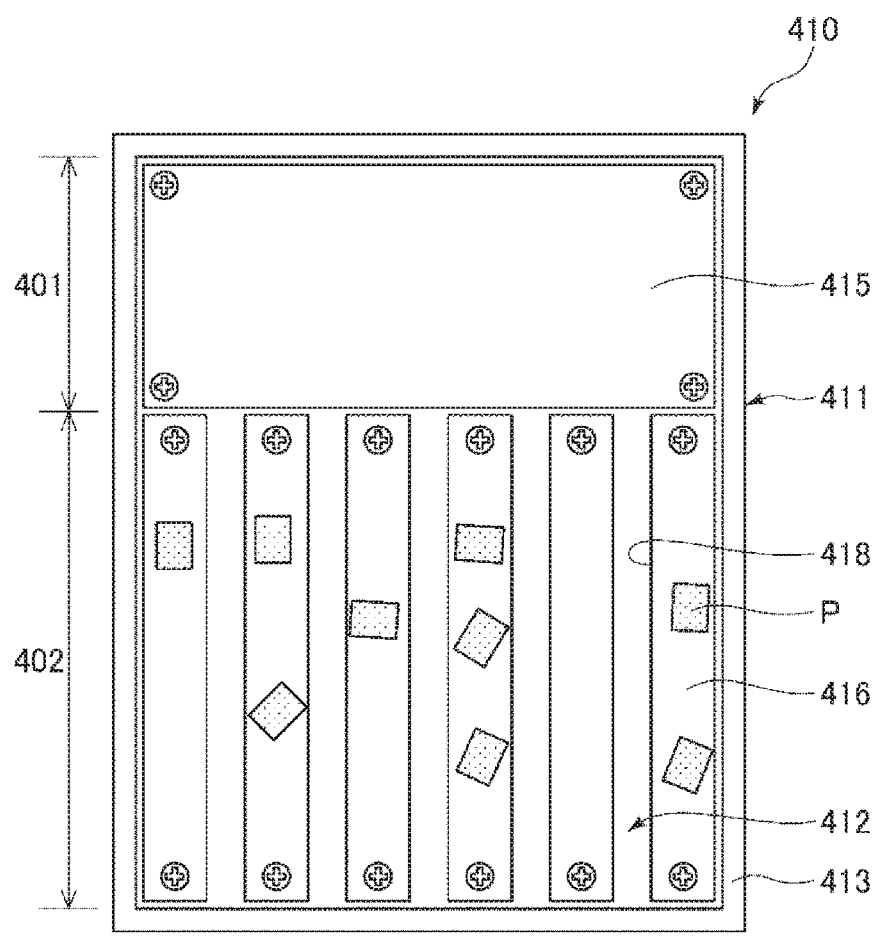
FIG. 13
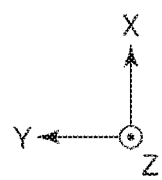

FEEDER AND ROBOT SYSTEM

The present application is based on, and claims priority from JP Application Serial Number 2019-101036, filed May 30, 2019, the disclosure of which is hereby incorporated by reference herein in its entirety.

BACKGROUND

1. Technical Field

The present disclosure relates to a feeder and robot system.

2. Related Art

In a production line for assembly work by a robot, fed parts are image-recognized and picked up by the robot. When the parts are picked up by the robot, a parts feeder that distributes the many fed parts is used. The parts are distributed, and thereby, the respective parts may easily take specific postures and the pickup by the robot is easier.

JP-A-2012-254864 discloses a sorter that sorts many fed articles into a plurality of rows during transport, including a mound-shaped center distribution unit for distributing articles fed from a feeder to right and left, and a plurality of mound-shaped sorting units provided on both of right and left sides of the center distribution unit for sorting the articles into a plurality of rows, wherein transport grooves for articles are formed by inclined surfaces of the center distribution unit and inclined surfaces of the sorting units.

In the sorter, the many fed articles are distributed to right and left by the center distribution unit, located in the respective transport grooves, and transported downstream. Thereby, the plurality of articles may be shorted into the plurality of rows.

In the sorter disclosed in JP-A-2012-254864, the inclined surfaces forming the transport grooves are extended in the article transport direction. Accordingly, the articles fed to the sorter are transported downstream in the transport grooves. In the sorter, the plurality of transport grooves in which the articles are transported are provided, but it is difficult for the articles to move between the adjacent transport grooves. The transport grooves in which the articles are transported are determined at the times when the articles are fed. When a feed opening for feeding articles to the sorter is smaller, the articles fed to the sorter are concentrated in one place and transported, and there is a problem that the articles are harder to be highly distributed. As a result, it is difficult to sufficiently separate the articles and the articles are harder to take predetermined postures. Thus, the pickup by the robot is difficult.

SUMMARY

A feeder according to an application example of the present disclosure is a feeder that feeds objects to be picked up by a robot, and includes an object container unit having a first planar portion including a first planar surface in which the objects are thrown, and a groove portion including a plurality of grooves extending in a first direction from the first planar portion as seen from a normal direction in which a normal of the first planar surface extends, and a vibrator unit that applies vibration to the object container unit, wherein the vibrator unit has a first vibration mode in which the objects are moved in the first direction.

BRIEF DESCRIPTION OF THE DRAWINGS

FIG. 13 is an explanatory diagram showing parts moving within the parts container unit in the pickup work of parts by the robot.

DESCRIPTION OF EXEMPLARY EMBODIMENTS

As below, preferred embodiments of a feeder and robot system according to the present disclosure will be explained in detail with reference to the accompanying drawings.

1. First Embodiment

First, the first embodiment will be explained.

Figure 1:
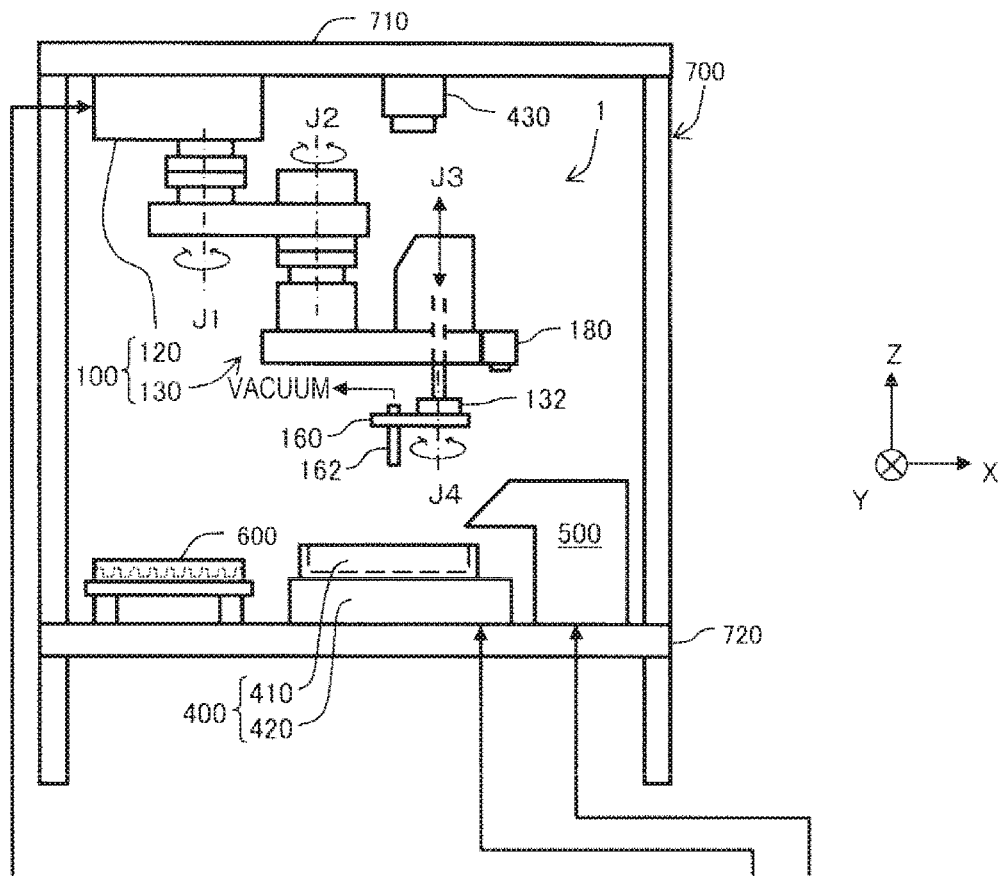
FIG. 1 is a conceptual diagram of a robot system according to a first embodiment.
Figure 1:
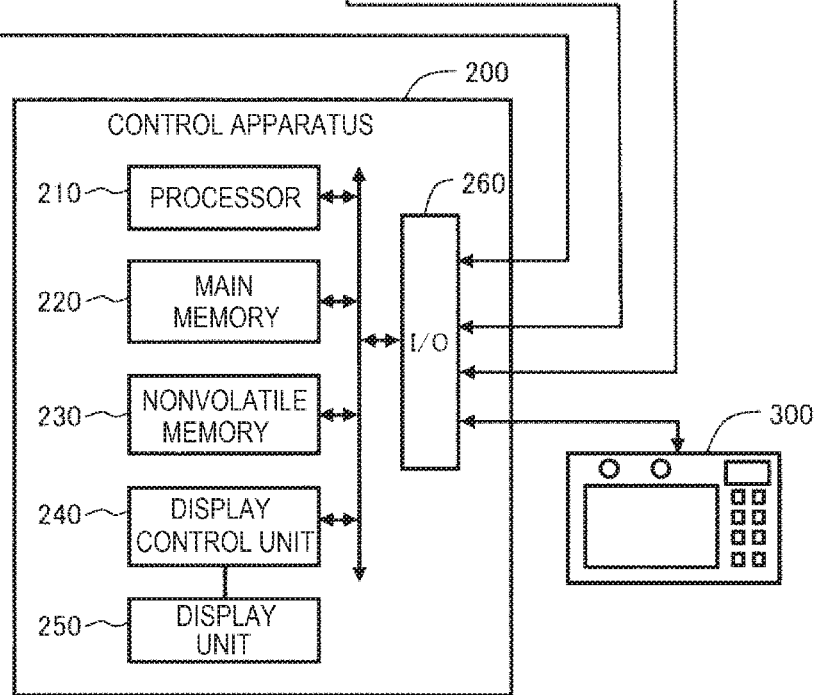
Figure 2:
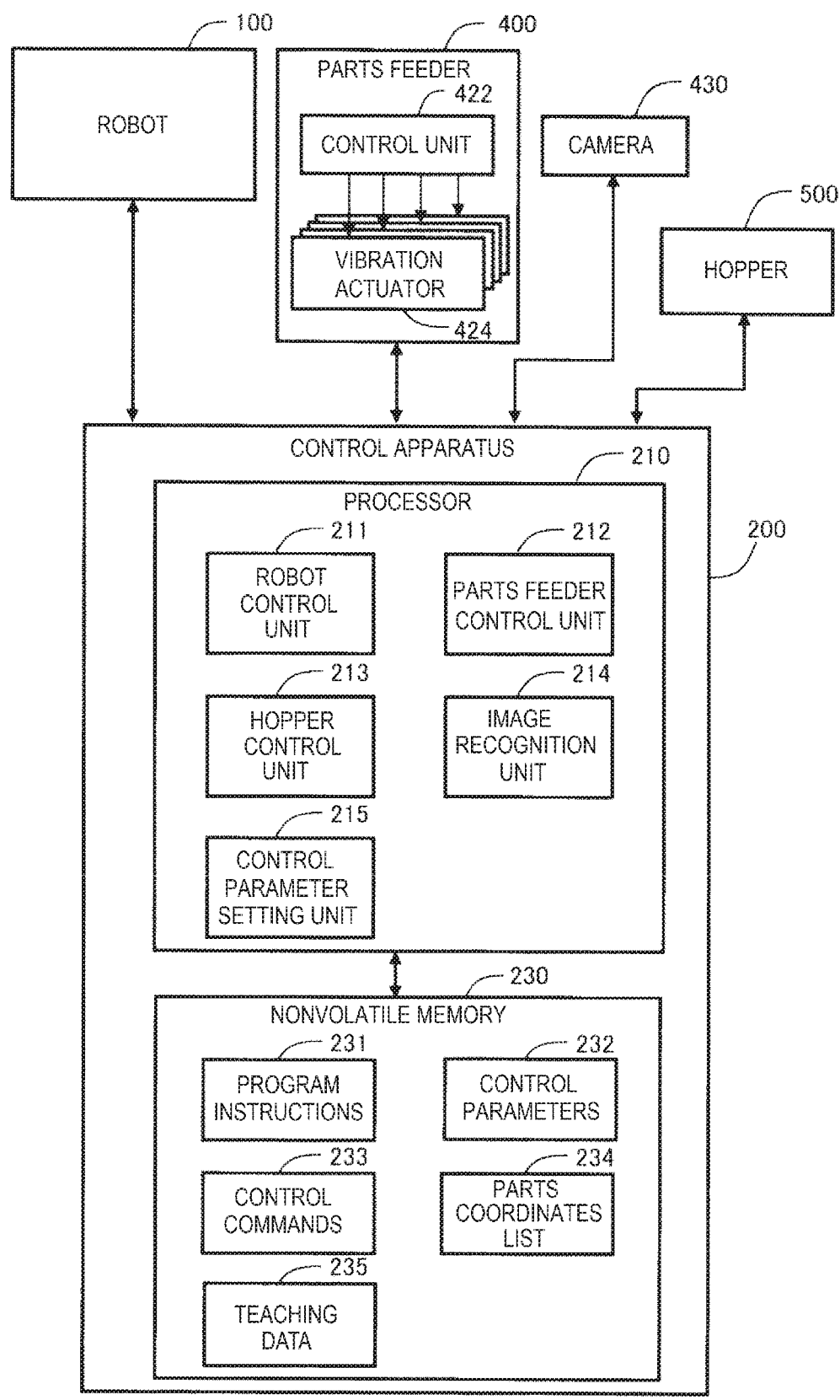
FIG. 2 is a functional block diagram of a control apparatus shown in FIG. 1.

FIG. 1 is the conceptual diagram of the robot system according to the first embodiment. FIG. 2 is the functional block diagram of the control apparatus shown in FIG. 1.

Note that, in the respective drawings of this application, an X-axis, a Y-axis, and a Z-axis are set as three axes orthogonal to one another. The X-axis and the Y-axis are parallel to the horizontal plane and the Z-axis is a vertical axis. Further, in the respective drawings, these axes are shown by arrows and, in the following description, the head sides of the arrows are referred to as "plus" and the tail sides are referred to as "minus". Furthermore, the plus side of the Z-axis is referred to as "upper" and the minus side of the Z-axis is referred to as "lower". In the following description, a plan view from the plus side of the Z-axis is simply referred to as "plan view".

A robot system 1 shown in FIG. 1 includes a robot 100, a control apparatus 200, a teaching pendant 300, a parts feeder 400, a hopper 500, and a parts tray 600.

Further, the robot system 1 shown in FIG. 1 is installed on a rack 700 having a top panel 710 and a table part 720. Specifically, the robot 100 shown in FIG. 1 is fixed to the lower surface of the top panel 710. Further, the parts feeder 400, the hopper 500, and the parts tray 600 are mounted on the table part 720 of the rack 700.

The robot 100 is a teaching-playback robot. The work using the robot 100 is executed according to teaching data created in advance.

The robot 100 includes a base 120 and an arm 130. The arm 130 is an articulated arm in which four joints J1 to J4 are sequentially coupled. Of these joints J1 to J4, the three joints are twisting joints and one joint J3 is a translational joint. In the embodiment, the four-axis robot is exemplified, however, a robot including an arbitrary arm mechanism having one or more joints may be employed.

An end effector 160 is attached to an arm end 132 as the distal end portion of the arm 130. The end effector 160 shown in FIG. 1 is a suction pickup mechanism having a suction nozzle 162 for vacuum suction of parts, however, another mechanism e.g. a gripping hand or magnetic hand may be employed. Further, a camera 180 is attached to the arm 130. The camera 180 is used for selection of the part that should be picked up when the part is picked up by the end effector 160. Note that the camera 180 can be omitted.

The parts feeder 400 has a parts container unit 410 that contains the parts and a vibrator unit 420 that vibrates the parts container unit 410. A camera 430 for capturing images of parts contained within the parts container unit 410 is placed on the lower surface of the top panel 710 of the rack 700.

The hopper 500 is a parts supply device that supplies parts to the parts feeder 400.

The parts tray 600 is a tray having many recesses for individually holding the parts. The robot 100 according to the embodiment performs work of picking up the parts from inside of the parts container unit 410 of the parts feeder 400 and placing the parts in proper positions within the parts tray 600. Note that the robot system 1 can be applied to other work.

The control apparatus 200 has a processor 210, a main memory 220, a nonvolatile memory 230, a display control unit 240, a display unit 250, and an I/O interface 260. These respective units are communicably coupled via an arbitrary bus. The processor 210 is e.g. a micro processor or processor circuit. The control apparatus 200 is coupled to the robot 100, the teaching pendant 300, the parts feeder 400, and the hopper 500 via the I/O interface 260. Further, the control apparatus 200 is coupled to the cameras 180, 430 via the I/O interface 260.

As the configuration of the control apparatus 200, various other configurations than the configuration shown in FIG. 1 can be employed. For example, the processor 210 and the main memory 220 may be provided in another apparatus communicably coupled to the control apparatus 200. In this case, the whole apparatus combining the other apparatus and the control apparatus 200 functions as the control apparatus of the robot 100. Or, the control apparatus 200 may have two or more processors 210. Or, the control apparatus 200 may be realized by a plurality of apparatuses communicably coupled to one another.

The teaching pendant 300 is a type of robot teaching apparatus used by a teaching operator for teaching actions of the robot 100. The teaching pendant 300 has a processor and a memory (not shown). The teaching data 235 created by teaching using the teaching pendant 300 is stored in the nonvolatile memory 230 of the control apparatus 200.

The processor 210 of the control apparatus 200 executes various program instructions 231 stored in the nonvolatile memory 230 in advance, and thereby, respectively realizes the functions of a robot control unit 211, a parts feeder control unit 212, a hopper control unit 213, an image recognition unit 214, and a control parameter setting unit 215. The parts feeder 400 includes a control unit 422 and a plurality of vibration actuators 424. The plurality of vibration actuators 424 are vibrators that vibrate the parts container unit 410.

The nonvolatile memory 230 stores control parameters 232 and control commands 233 for the vibration actuators 424 and a parts coordinates list 234 in addition to the program instructions 231 and the teaching data 235. The robot control unit 211, the parts feeder control unit 212, and the hopper control unit 213 control operations of the respective units according to the teaching data 235.

Figure 3:
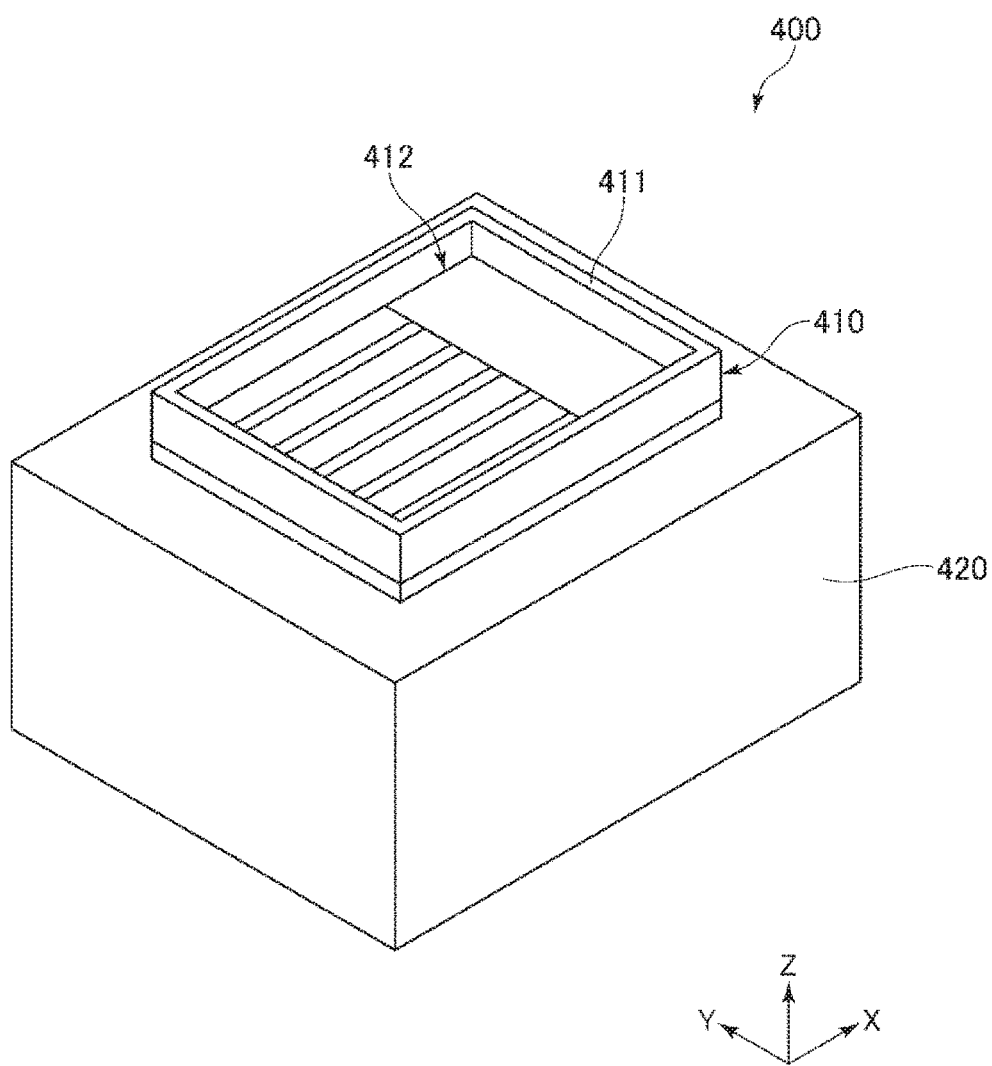
FIG. 3 is a perspective view showing a parts feeder in FIG. 1.
Figure 4:
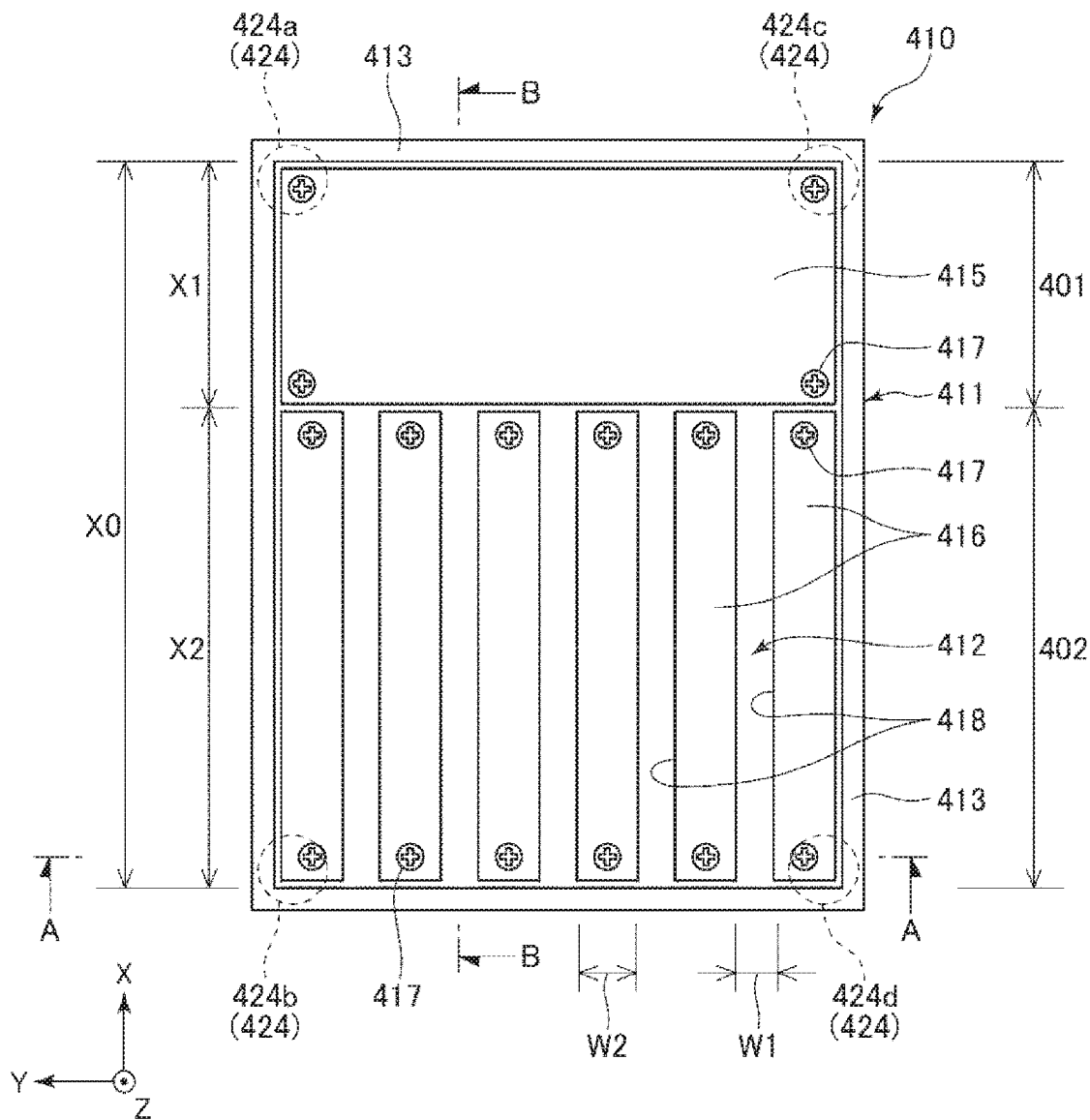
FIG. 4 is a plan view of a parts container unit provided in the parts feeder shown in FIG. 3 as seen from a plus side of a Z-axis.

FIG. 3 is the perspective view showing the parts feeder 400 in FIG. 1. FIG. 4 is the plan view of the parts container unit 410 provided in the parts feeder 400 shown in FIG. 3 as seen from the plus side of the Z-axis.

The parts feeder 400 shown in FIG. 3 has the parts container unit 410 and the vibrator unit 420.

As shown in FIG. 4, the parts container unit 410 has a container 411, and a first member 415 and a plurality of second members 416 held within the container 411.

Of the members, the container 411 has a parts container area 412 and an outer peripheral wall 413 provided on the outer periphery of the parts container area 412 and extending toward the plus side of the Z-axis. The parts container area 412 corresponds to a bottom surface of the container 411 and has a rectangular shape as shown in FIG. 4. The parts container area 412 shown in FIG. 4 has a long axis parallel to the X-axis. To stably contain the parts, it is preferable to keep the parts container area 412 horizontal.

Further, as described above, the first member 415 and the plurality of second members 416 are provided in the parts container area 412.

The first member 415 is a plate-like member mounted in a portion at the plus side of the X-axis of the parts container area 412. As shown in FIG. 4, the plan view shape of the first member 415 is a rectangular shape having a long axis parallel to the Y-axis. The length of the long side of the first member 415 is substantially equal to the length of the short side of the parts container area 412. On the other hand, a length X1 of the short side of the first member 415 is not particularly limited as long as the length is shorter than a length X0 of the long side of the parts container area 412, but preferably equal to or less than 50% of the length X0 and more preferably from 5% to 40%.

Note that the plan view shape of the first member 415 is not limited to that described as above, but may be any shape. Or, the first member 415 may be divided into a plurality of pieces.

The first member 415 is fixed to the parts container area 412 by screws 417. Therefore, the first member 415 may be easily detached from the parts container area 412 by loosening of the screws 417.

Note that the first member 415 and the members to be described may be fixed to the parts container area 412 by other members than the screws 417. The other members than the screws 417 may be e.g. double-sided tape, hook and loop fastener, adhesive agent, or the like.

The second members 416 are plate-like members mounted on a portion at the minus side of the X-axis of the first member 415. In FIG. 4, the six second members 416 are provided. As shown in FIG. 4, the plan view shape of the respective second members 416 is a rectangular shape having a long axis parallel to the X-axis. The six second members 416 are arranged at fixed intervals along the Y-axis. Thereby, five grooves 418 are formed between the second members 416. Therefore, these grooves 418 extend parallel to one another from the first member 415 toward the minus side of the X-axis. In other words, when the direction toward the minus side of the X-axis as seen from a normal direction in which the normal of the upper surface of the first member 415 extends, i.e., the plus side of the Z-axis is referred to as "first direction", the plurality of grooves 418 extend along the first direction from the first member 415.

A length X2 of the long sides of the second members 416 is not particularly limited as long as the length is shorter than the length X0 of the long side of the parts container area 412, but preferably equal to or less than 95% of the length X0 and more preferably from 5% to 90%.

Note that the plan view shape of the second members 416 is not limited to that described as above, but may be any shape. Or, the second members 416 may be further divided into pluralities of pieces.

The width and depth of the grooves 418 are designed, when the parts are located within the grooves, to cause a high probability that the parts turn under their own weights and take certain postures. Therefore, it is desirable that the grooves 418 are configured to be appropriately variable according to the type of the parts. In the viewpoint, the second members 416 according to the embodiment are fixed to the parts container area 412 by screws 417 like the first member 415. That is, the grooves 418 according to the embodiment are grooves with the parts container area 412 as bottom surfaces and the adjacent second members 416 as respective side surfaces. According to the configuration, the second members 416 may be easily detached from the parts container area 412 by loosening of the screws 417. Further, a width W1 of the grooves 418 may be easily changed by fixation of the second members 416 in a different position.

Therefore, the length of the grooves 418 along the Y-axis, i.e., the width W1 of the grooves 418 is appropriately set according to the type of parts and not particularly limited, but preferably smaller than a width W2 of the second members 416. In other words, it is preferable that the width W2 of the second members 416 is larger than the width W1 of the grooves 418. Thereby, when the parts are located within both of the adjacent grooves 418, reduction of gaps between the parts and difficulty in movement of the other parts from the gaps toward the minus side of the X-axis may be suppressed. That is, jamming of parts may be suppressed. Note that, in this specification, the length along the Y-axis is also referred to as "width".

According to the above described first member 415 and second members 416, the parts container unit 410 has two regions of a first planar portion 401 and a groove portion 402 as regions in which the contained parts are located. The first planar portion 401 is the region formed by the upper surface of the first member 415, i.e., the substantially planar surface. In other words, the first planar portion 401 includes the upper surface of the first planar member 415 as "first planar surface". The groove portion 402 is the region located at the minus side of the X-axis of the first planar portion 401 and formed by the upper surfaces of the plurality of second members 416 and the grooves 418 located between the surfaces.

As will be described later, the first planar portion 401 is a region that receives supply of the parts from the hopper 500. Further, as described above, the groove portion 402 is a region for the robot 1 to easily pick up the parts taking predetermined postures using the situation that, when the parts are located within the grooves 418, the high probability that the parts take certain postures is caused.

Note that, as described above, the first planar portion 401 preferably includes the substantially planar first planar surface, but may have some irregularities. It is only necessary that the depths of the irregularities are sufficiently shallower than the depth of the grooves 418 and do not hinder sliding of the parts. As an example, it is preferable that the maximum depth is equal to or less than 1 mm. Thereby, the parts located in the first planar portion 401 may slidingly move even by slight vibration.

As described above, the vibrator unit 420 is provided under the parts container unit 410. In the vibrator unit 420, four vibration actuators 424a to 424d are provided. Using the vibration actuators 424a to 424d, arbitrary vibration may be applied to the parts container unit 410. Thereby, the parts contained in the parts container area 412 may be moved within the parts container area 412. Note that the number of the vibration actuators is not particularly limited, but may be one to three, five, or more. In FIG. 4, the four vibration actuators are provided for placement in the four corners of the parts container area 412.

The vibrator unit 420 is configured to perform various actions according to various commands 233 transmitted from the parts feeder control unit 212 of the control apparatus 200. The respective control commands 233 include e.g. the following control parameters 232.

(1) Frequency of vibration signal
(2) Amplitude of vibration signal
(3) Phase of vibration signal
(4) Vibration duration "Vibration signals" are signals provided from the control unit 422 of the parts feeder 400 to the vibration actuators 424a to 424d, and the vibration actuators 424a to 424d vibrate independently of one another according to the vibration signals.

In addition, the control commands 233 may include waveforms of vibration signals as control parameters 232 of the vibration actuators 424a to 424d.

As below, as representative control commands 233, a shift command, a back-shift command, and a flip command will be explained. Note that the control parameters 232 of the vibration actuators 424 are also referred to as "vibration parameters".

Figure 5:
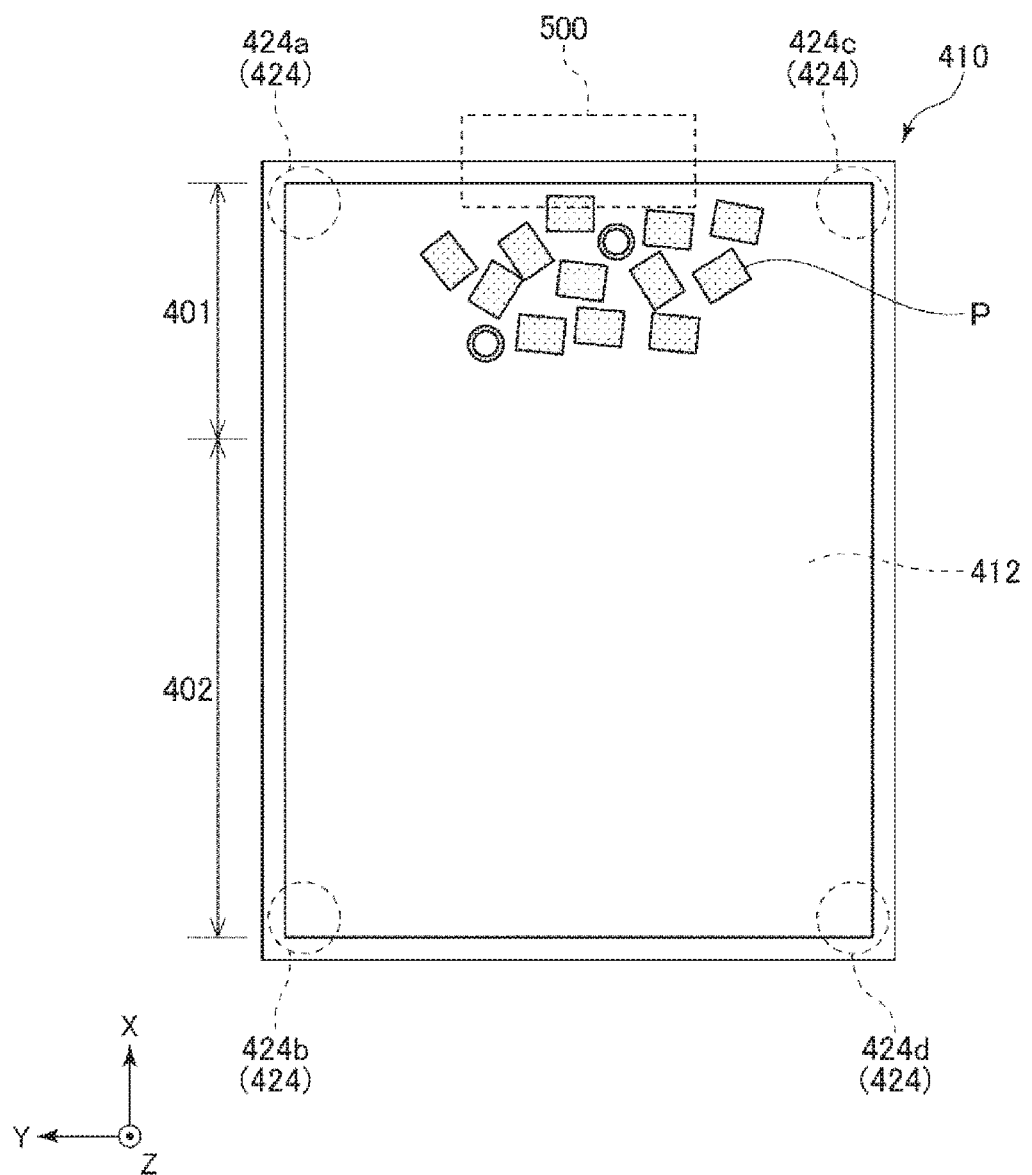
FIG. 5 is a plan view showing a state immediately after parts are thrown in the parts container unit from a hopper.
Figure 6:
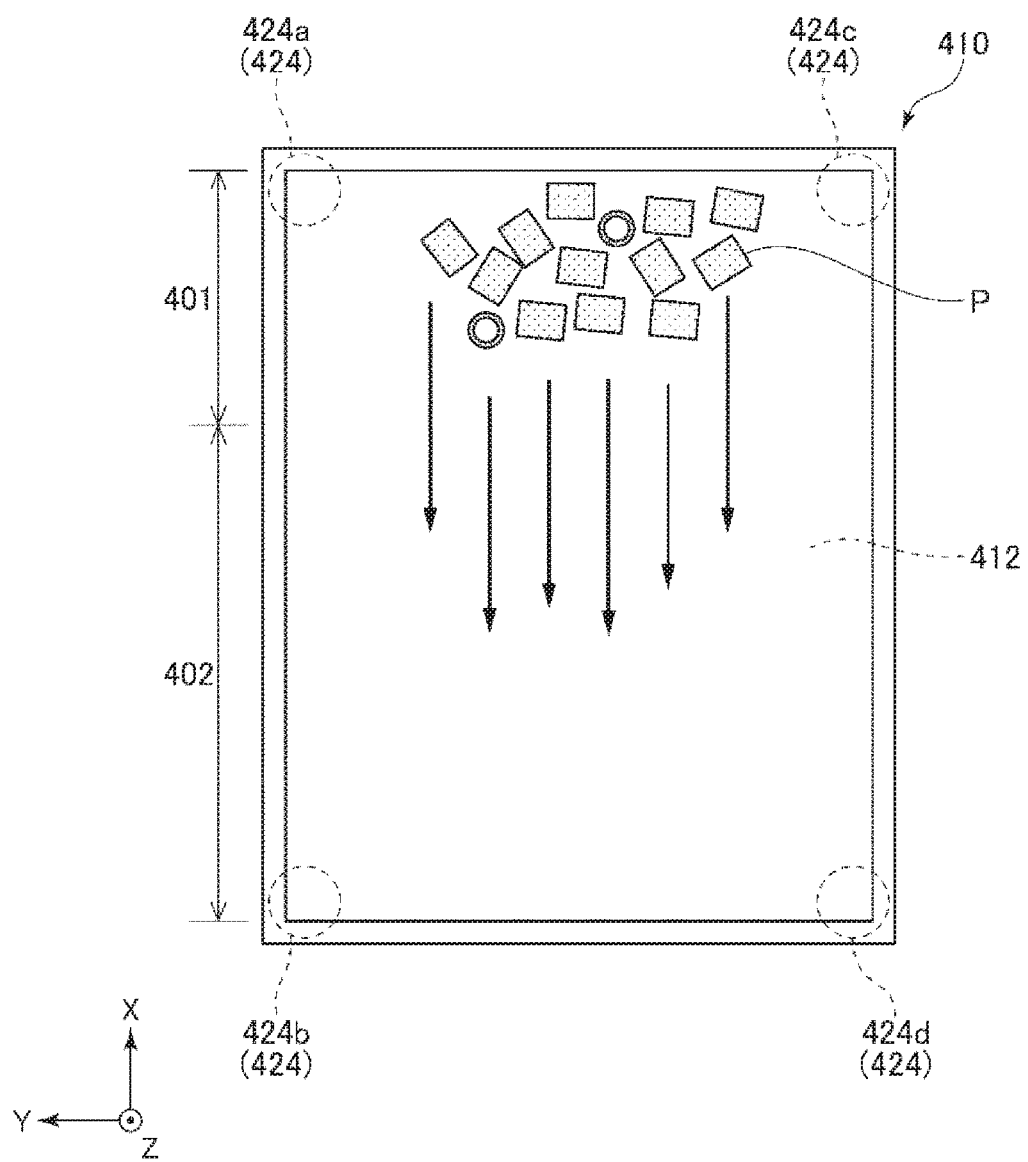
FIG. 6 is a plan view of the parts container unit for explanation of a shift action by a shift command.
Figure 7:
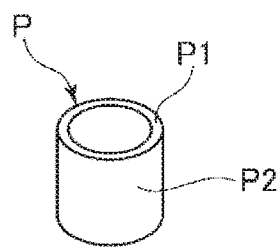
FIG. 7 is a perspective view showing an example of a part.

FIG. 5 is the plan view showing the state immediately after parts P are thrown in the parts container unit 410 from the hopper 500. FIG. 6 is the plan view of the parts container unit 410 for explanation of the shift action by the shift command. Note that, in FIG. 6, illustration of part of the members is omitted. FIG. 7 is the perspective view showing the example of the part P.

The parts P shown in FIGS. 5 and 6 have cylindrical shapes as shown in FIG. 7 as an example. The parts P having the cylindrical shapes mainly take two postures as stable postures. In the posture in which an end surface P1 of the cylinder contacts the first planar portion 401, in the plan view of the first planar portion 401, the part appears in an annular shape and, in the posture in which a side surface P2 of the cylinder contacts the first planar portion 401, the part appears in a rectangular shape. Note that the shape of the part P shown in FIG. 7 is just the example, not limited thereto.

When the many parts P are thrown from the hopper 500, as shown in FIG. 5, the parts P are collected immediately below the hopper 500 and contained in the parts container unit 410. The first planar portion 401 is located immediately below the hopper 500, and thereby, most of these parts P are contained in the first planar portion 401.

In the shift action, of the vibration actuators 424a to 424d, control is performed to vibrate the vibration actuators 424a, 424c, but not to vibrate the other vibration actuators 424b, 424d. The vibration mode is referred to as "first vibration mode". Thereby, the parts P contained in the first planar portion 401 move toward the minus side of the X-axis as shown by arrows in FIG. 6. That is, the parts P may be shifted.

For example, the shift command includes the following control parameters 232.

(1) Frequency of vibration signal: the frequency that can activate movement of the parts P e.g. the resonance frequency of the parts container area 412

(2) Amplitude of vibration signal: the amplitude that may increase the movement speed in a range in which the parts P do not fly out of the parts container unit 410

(3) Phase of vibration signal: the same phase for the plurality of vibration actuators 424a to 424d (4) Vibration duration: the time in which the parts P move a half of the length X0 of the long side of the parts container area 412

Figure 8:
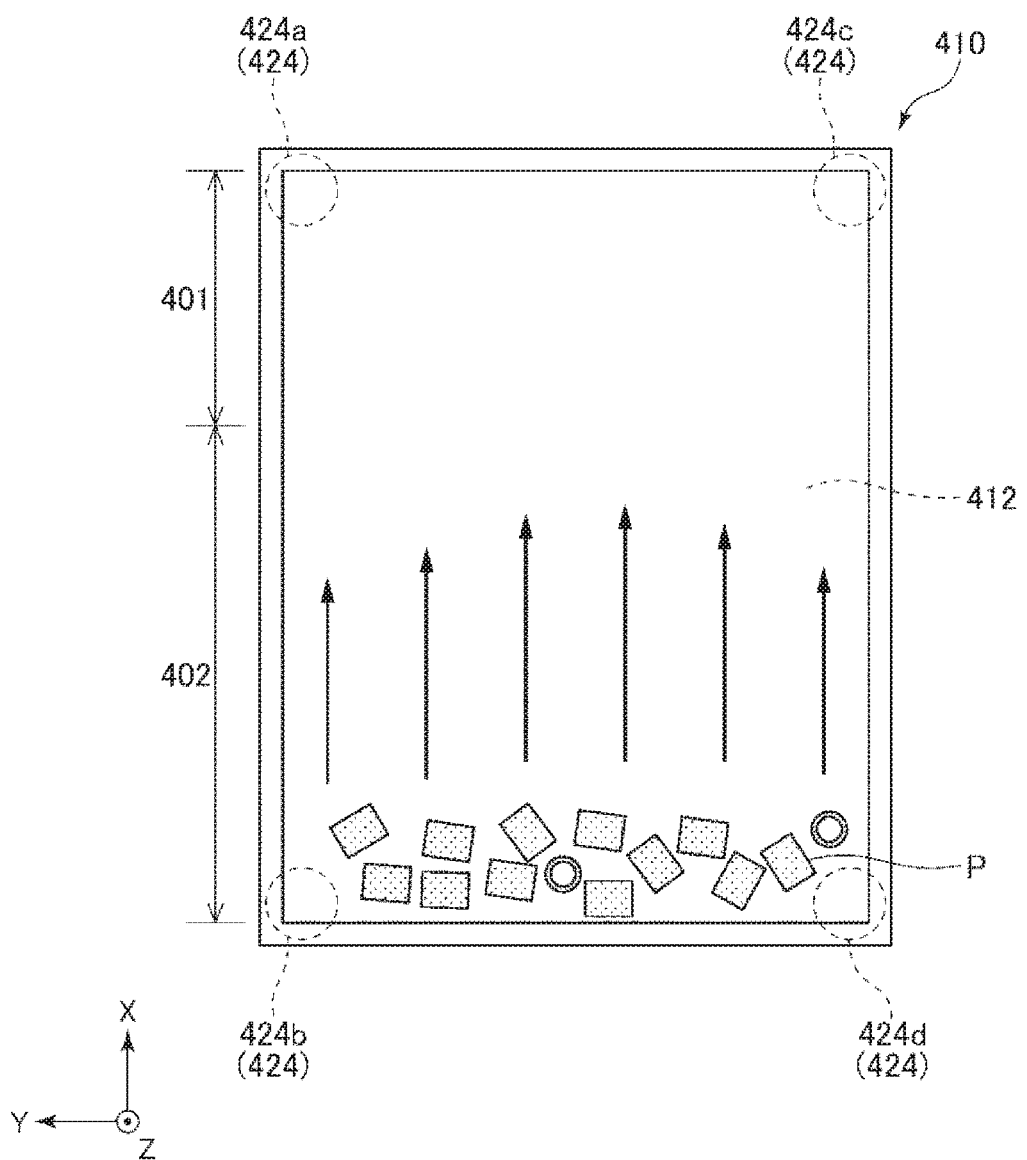
FIG. 8 is a plan view of the parts container unit for explanation of a back-shift action by a back-shift command.

FIG. 8 is the plan view of the parts container unit 410 for explanation of the back-shift action by the back-shift command.

In the back-shift action, of the vibration actuators 424a to 424d, control is performed to vibrate the vibration actuators 424b, 424d, but not to vibrate the other vibration actuators 424a, 424c. The vibration mode is referred to as "second vibration mode". Thereby, for example, the parts P moved into the groove portion 402 move to return toward the plus side of the X-axis as shown by arrows in FIG. 8. That is, the parts P may be back-shifted.

For example, the back-shift command includes the following control parameters 232.

(1) Frequency of vibration signal: the frequency that can activate movement of the parts P e.g. the resonance frequency of the parts container area 412

(2) Amplitude of vibration signal: the amplitude that may increase the movement speed in a range in which the parts P do not fly out of the parts container unit 410

Figure 9:
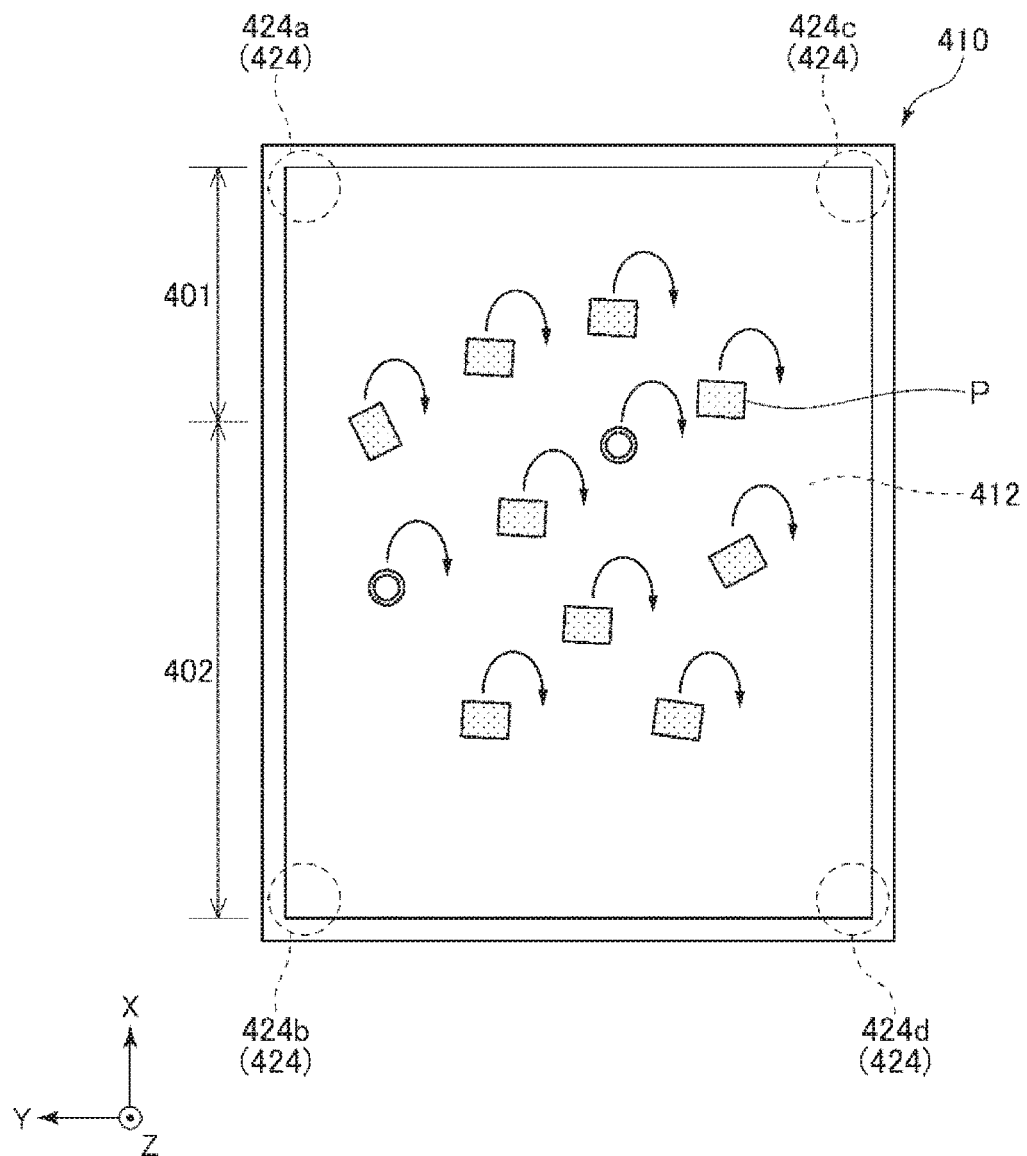
FIG. 9 is a plan view of the parts container unit for explanation of a flip action by a flip command.

(3) Phase of vibration signal: the same phase for the plurality of vibration actuators 424a to 424d (4) Vibration duration: the time in which the parts P are sufficiently distributed while returning toward the plus side of the X-axis FIG. 9 is the plan view of the parts container unit 410 for explanation of the flip action by the flip command.

In the flip action, all of the vibration actuators 424a to 424d are simultaneously vibrated. The vibration mode is referred to as "third vibration mode". Thereby, the parts P contained in the first planar portion 401 may move to jump toward the plus side of the X-axis and change the postures of the parts P.

For example, the flip command includes the following control parameters 232.

(1) Frequency of vibration signal: the frequency that can activate movement of the parts P e.g. the resonance frequency of the parts container area 412

(2) Amplitude of vibration signal: the amplitude as large as possible in a range in which the parts P do not fly out of the parts container unit 410

(3) Phase of vibration signal: the same phase for the plurality of vibration actuators 424a to 424d (4) Vibration duration: the time in which the parts P jump only once Note that, in the flip command, the vibration duration may be set to be shorter than those of the shift command and the back-shift command. That is, the flip action of the parts P requires only a shorter time than the shift action or the back-shift action. Accordingly, to change the postures of the parts P, the flip command is selected, and thereby, the cycle time in the pickup work may be shortened.

The parts feeder control unit 212 selects one or more control commands 233 from the plurality of control commands 233 and transmits the selected control commands 233 to the parts feeder 400, and thereby, vibrates the vibration actuators 424a to 424d in the first vibration mode, the second vibration mode, or the third vibration mode and controls the parts feeder 400 to perform the above described various actions. By the actions, a high probability that the parts P contained in the parts container unit 410 take certain postures in the groove portion 402 is higher. Thereby, the efficiency of the pickup work by the robot 100 may be improved. Note that the various control commands 233 transmitted from the parts feeder control unit 212 may be other commands than those described above.

Next, in the pickup work of the parts P by the robot 100, a feeding operation of the parts P in the parts feeder 400 will be explained.

FIGS. 10 to 14 are respectively explanatory diagrams showing parts P moving within the parts container unit 410 in the pickup work of parts P by the robot 100.

Figure 10:
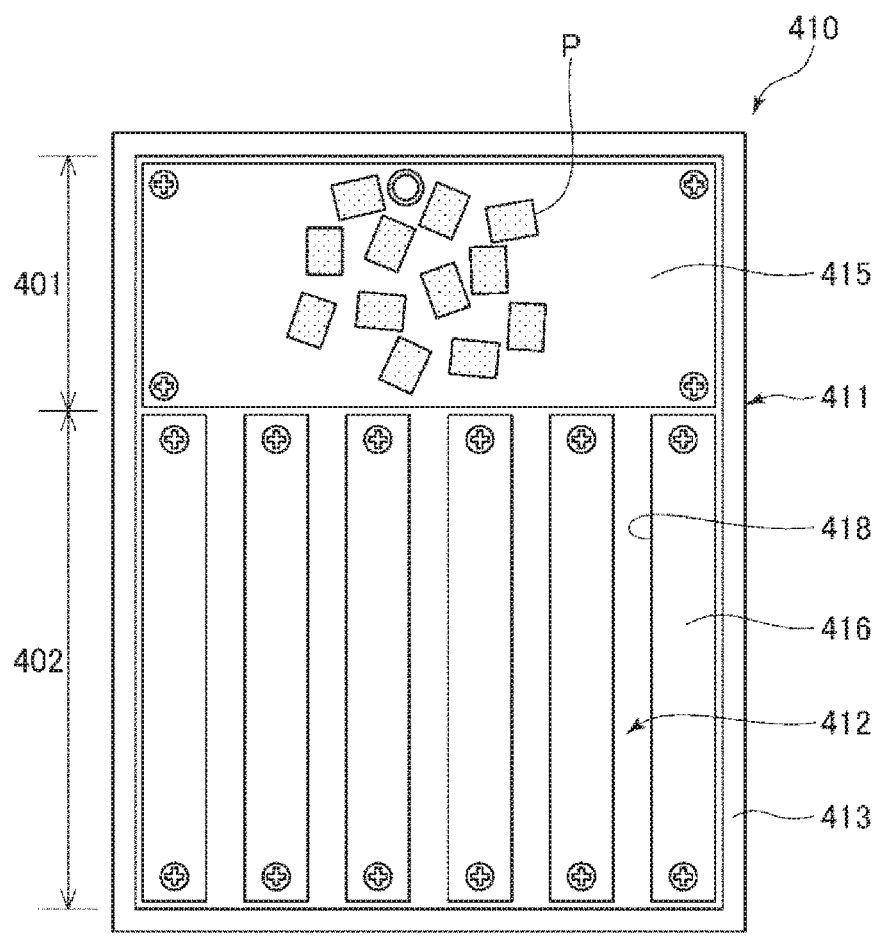
FIG. 10 is an explanatory diagram showing parts moving within the parts container unit in pickup work of parts by a robot.

Like FIG. 5, FIG. 10 is the plan view showing the state immediately after the parts P are thrown in the parts container unit 410 from the hopper 500. The width of the hopper 500 is smaller than the width of the parts container area 412, and thus, at the time immediately after being thrown in, the parts P are collected in the center portion along the Y-axis of the first planar portion 401. In this state, even when the parts P are subsequently moved to the groove portion 402 by the shift action, the parts P may be concentrated in part of the grooves 418.

Accordingly, the parts container unit 410 according to the embodiment has both the first planar portion 401 and the groove portion 402. As described above, the first planar portion 401 includes the substantially planar first planar surface and the parts P easily slidingly move. Therefore, the parts P collected in one part may spread to the right and left in FIG. 10 by vibration relatively easily.

Note that, in the embodiment, the cylinder is used as the example of the part P as shown in FIG. 7, however, in the case of the shape, when the parts are thrown in the parts container unit 410, the parts often take the postures in which the side surfaces P2 of the cylinders contact the first planar portion 401 in view of the probability. On the other hand, as described above, regarding the parts P, the postures in which the end surfaces P1 of the cylinders contact the first planar portion 401 are one of the stably postures. The robot 100 according to the embodiment is set to perform pickup when the parts take the postures in which the end surfaces P1 of the cylinders contact the first planar portion. Therefore, the parts feeder 400 moves and rolls the parts P so that the parts P may take the pickup postures.

Figure 11:
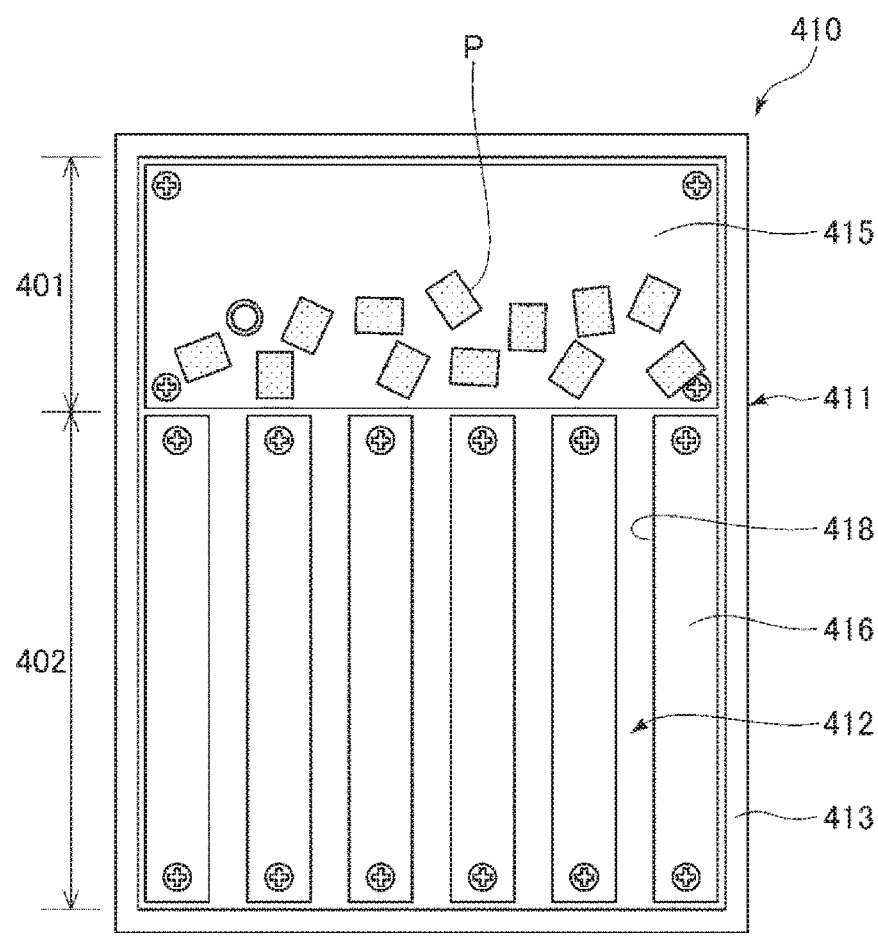
FIG. 11 is an explanatory diagram showing parts moving within the parts container unit in the pickup work of parts by the robot.
Figure 12:
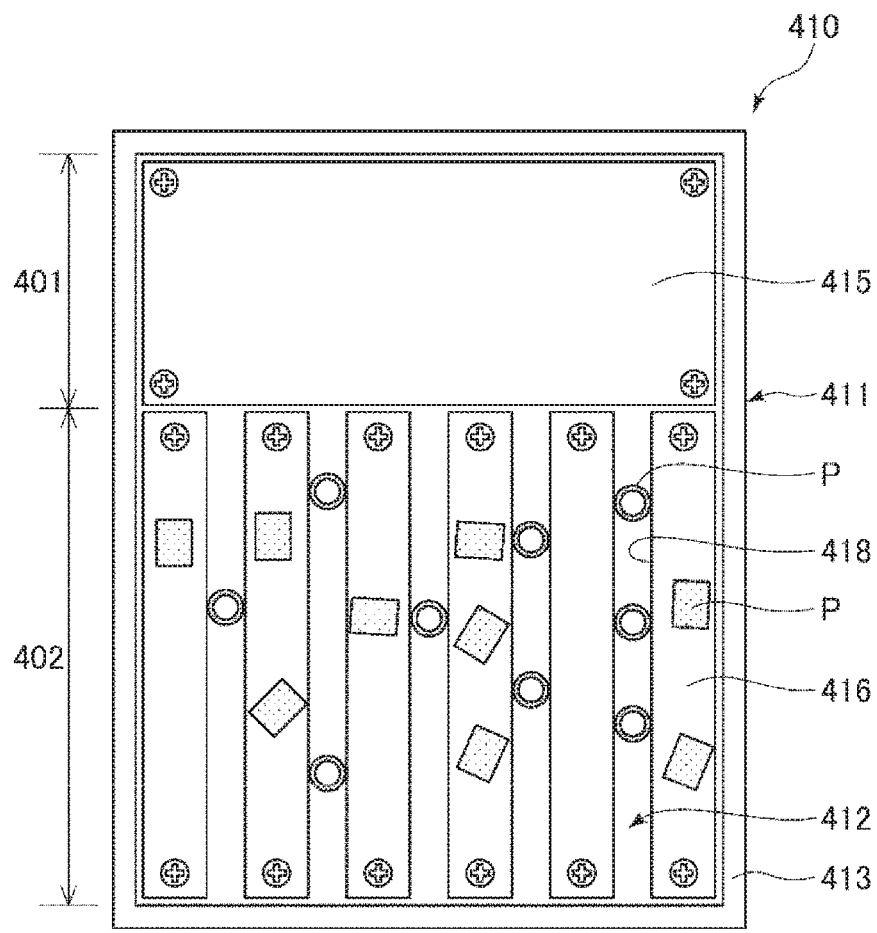
FIG. 12 is an explanatory diagram showing parts moving within the parts container unit in the pickup work of parts by the robot.

From the state shown in FIG. 10, the control command 233 is transmitted to control the vibrator unit 420 to perform the shift action. When the shift action is performed, the parts P collected in the first planar portion 401 once spread to the right and left as shown in FIG. 11. This is because, when the parts P contact and separate, the parts move in both directions along the Y-axis in which the parts are easily slidable by the vibration with the shift action. Thereby, the parts P may be spread to the entire of the groove portion 402 along the Y-axis. Then, the parts P move toward the minus side of the X-axis by the shift action and, as shown in FIG. 12, the parts P are distributed in the groove portion 402. In this state, the probability that the parts P are located within the grooves 418 is higher. The insides of the grooves 418 are located vertically below the upper surface of the first member 415 and the upper surfaces of the second members 416, and the probability that the parts P are located within the grooves 418 is higher under their own weights. Further, the grooves 418 are designed so that the parts P take certain postures, and thus, the parts P located within the grooves 418 take e.g. the postures with the end surfaces P1 facing upward as shown in FIG. 7, i.e., the pickup postures. As a result, the appearance ratio of the pickup posture may be increased. Note that detection of the pickup posture and the other posture is performed by acquisition of images of the parts P using the camera 430 and execution of image recognition processing on the images using the image recognition unit 214.

Specifically, the detection is performed by the image recognition unit 214 executing image recognition processing of recognizing the parts P present within the groove portion 402 using the images captured by the camera 430. The image recognition processing is e.g. processing of storing the respective template images of the end surface P1 and the side surface P2 in the nonvolatile memory 230 in advance and executing template matching on the images captured by the camera 430. Then, the coordinates of the end surfaces P1 of the parts P1 in the pickup postures are registered in the parts coordinates list 234.

The coordinates of the end surface P1 with respect to the single part P are read from the parts coordinates list 234. Then, the end effector 160 is moved to the position of the coordinates and picks up the part. The robot 100 places the picked up part P in the parts tray 600. These works are repeatedly performed, and thereby, the parts P in the groove portion 402 are sequentially picked up.

When the pickup work by the robot 100 progresses, as shown in FIG. 13, the parts P in the pickup postures may be run out. In this state, the appearance ratio of the pickup posture is zero and the robot 100 no longer can perform the pickup work, and thus, it is necessary to change the postures of the parts P. When the absence or fewness of the parts P in the pickup postures is detected by the image recognition processing, the control command 233 is transmitted to control the vibrator unit 420 to perform the shift action again. Thereby, as shown in FIG. 12, part of the parts P are located within the grooves 418 and the appearance ratio of the pickup posture may be improved. Then, the pickup work and the shift action may be repeated. Or, in place of the shift action, the flip action and the back-shift action may be performed.

Figure 14:
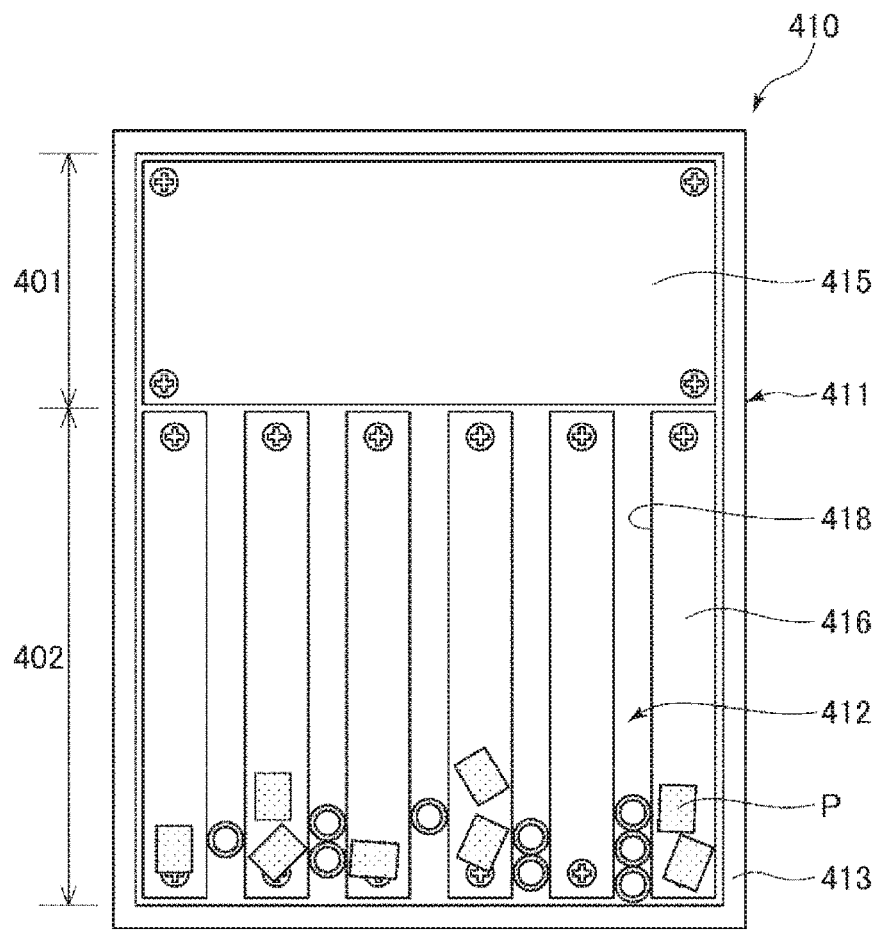
FIG. 14 is an explanatory diagram showing parts moving within the parts container unit in the pickup work of parts by the robot.
Figure 14:
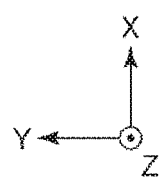

On the other hand, when the shift action is repeated, as shown in FIG. 14, many parts P may be collected at the minus side of the X-axis. This state is called a jam. When a jam occurs, the distances between the parts P are smaller and the pickup work by the robot 100 may be hindered. When occurrence of a jam is detected by the image recognition processing, the control command 233 is transmitted to control the vibrator unit 420 to perform the back-shift action. Thereby, the parts P move to return toward the plus side of the X-axis. Further, concurrently, the parts P are distributed in the groove portion 402. Accordingly, as shown in FIG. 12, many parts P taking the pickup positions may appear. Then, the pickup work may be performed again. Note that the ratio between the shift action and the back-shift action is not particularly limited, but, as an example, the three shift actions to the single back-shift action.

As described above, when the appearance ratio of the pickup posture is lower or a jam occurs, the appearance ratio of the pickup posture may be improved or the jam may be resolved using at least one of the shift action, the back-shift action, and the flip action. In this regard, when the parts P move to the first planar portion 401, not only the movement along the X-axis but also the movement along the Y-axis can be performed. Accordingly, the parts may be distributed more highly and the appearance ratio of the pickup posture may be easily increased.

Note that, when the absence or fewness of the parts P contained in the parts container unit 410 is detected, new parts P are supplied from the hopper 500. The supply of the parts P may be performed in parallel to various actions and the pickup work in the parts feeder 400. The parts P supplied into the first planar portion 401 spread in both directions along the Y-axis and are harder to be unevenly located. Thereby, even when the parts P are supplied in the middle of the pickup work, the pickup work may be efficiently performed.

As described above, the parts feeder 400 according to the embodiment is a feeder that feeds the parts P as objects to be picked up by the robot 100, and includes the parts container unit 410 (object container unit) having the first planar portion 401 in which the parts P are thrown and the groove portion 402 including the plurality of grooves 418 extending in the direction toward the minus side of the X-axis from the first planar portion 401 (first direction) as seen from the normal direction in which the normal of the first planar surface included in the first planar portion 401 extends, i.e., the plus side of the Z-axis, and the vibrator unit 420 that applies vibration to the parts container unit 410. The vibrator unit 420 has the first vibration mode in which the parts P are moved in the direction toward the minus side of the X-axis.

According to the parts feeder 400, the parts container unit 410 including both the first planar portion 401 and the groove portion 402 is provided, and thereby, even when the parts P are thrown in a part of the first planar portion 401, the parts may be easily moved to spread. Accordingly, when the parts P are moved to the groove portion 402 adjacent to the first planar portion 401, the parts P are easily distributed in the groove portion 402. Therefore, when the parts P are located within the grooves 418, the distances between the parts P may be secured and the appearance ratio of the pickup posture may be increased. As a result, the success rate of the pickup work by the robot 100 may be improved. That is, the parts P may be fed so that the higher pickup success rate may be realized.

The above described robot system 1 includes the parts feeder 400 (feeder) and the robot 100 having the end effector 160 that picks up the parts P (objects) contained in the parts container unit 410 (object container unit) of the parts feeder 400.

According to the robot system 1, in the parts feeder 400, the appearance ratio of the pickup posture with respect to the parts P may be increased. Accordingly, when the robot 100 picks up the parts P, the higher success rate may be realized and the robot system 1 having the higher pickup efficiency may be realized.

Further, the vibrator unit 420 of the parts feeder 400 according to the embodiment has the first vibration mode in which the parts P as objects are moved in the direction toward the minus side of the X-axis (first direction) and the second vibration mode in which the parts are moved in the direction toward the plus side of the X-axis (second direction) opposite to the direction. The vibrator unit 420 may distribute the parts P unevenly located by the shift action in the first vibration mode by the backshift action in the second vibration mode. Thereby, the appearance ratio of the pickup posture may be increased.

Note that the second vibration mode is selected based on the image captured by the camera 430 (imaging unit) of the robot system 1.

Specifically, whether or not the back-shift action is required may be determined by execution of the image recognition processing on the image obtained by imaging of the parts container unit 410 with the camera 430.

Therefore, the robot system 1 according to the embodiment includes the camera 430 that images the parts P (objects) contained in the parts container unit 410 (object container unit), when a predetermined number or more of the parts P located in the groove portion 402 are detected by the image captured by the camera 430, the vibrator unit 420 applies vibration to the parts container unit 410 in the second vibration mode in which the parts P are moved in the direction toward the plus side of the X-axis (second direction) opposite to the direction toward the minus side of the X-axis (first direction). Thereby, the jam of the parts P may be properly captured, and the time loss with the jam may be minimized and the appearance ratio of the pickup posture may be increased.

Note that the predetermined number or more of the parts P located in the groove portion 402 refers to parts P in other postures than the pickup posture occupying an area ratio of 20% or more. In the case of the area ratio, the appearance ratio of the pickup posture may be easily increased by the back-shift action.

The parts feeder control unit 212 may be configured to appropriately select the vibration mode based on other information than the image captured by the camera 430.

Here, the parts container unit 410 will be described in detail.

Figure 15:
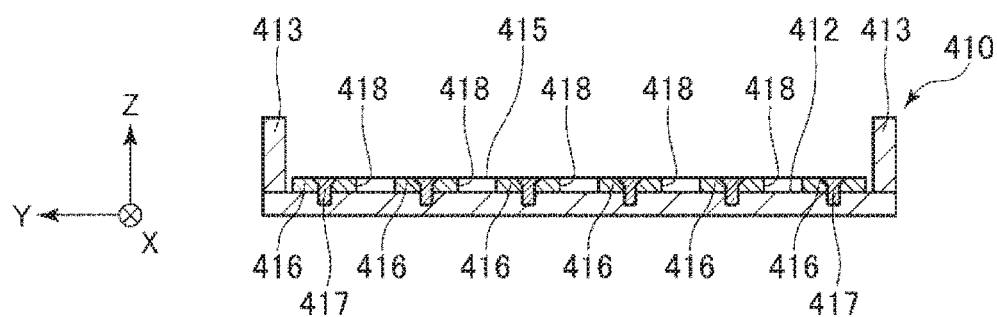
FIG. 15 is a sectional view along line A-A in FIG. 4.
Figure 16:
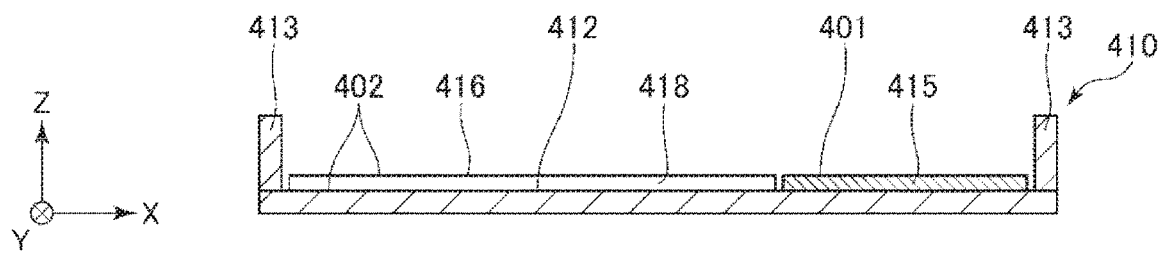
FIG. 16 is a sectional view along line B-B in FIG. 4.

FIG. 15 is the sectional view along line A-A in FIG. 4. FIG. 16 is the sectional view along line B-B in FIG. 4.

In the parts container unit 410 shown in FIGS. 15 and 16, the height of the upper surface of the first member 415 and the height of the upper surfaces of the second members 416 are substantially equal. Accordingly, the parts P thrown in the first planar portion 401, i.e., the upper surface of the first member 415 may be moved not only to the grooves 418 but also to the upper surfaces of the second members 416 relatively easily. Note that "height" in this specification refers to a position along the Z-axis and "the height is higher" means that located relatively at the plus side of the Z-axis.

Figure 17:
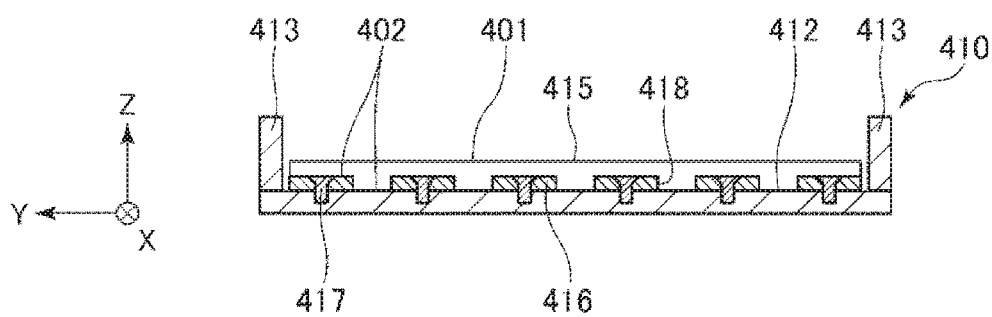
FIG. 17 is a modified example of FIG. 15.
Figure 18:
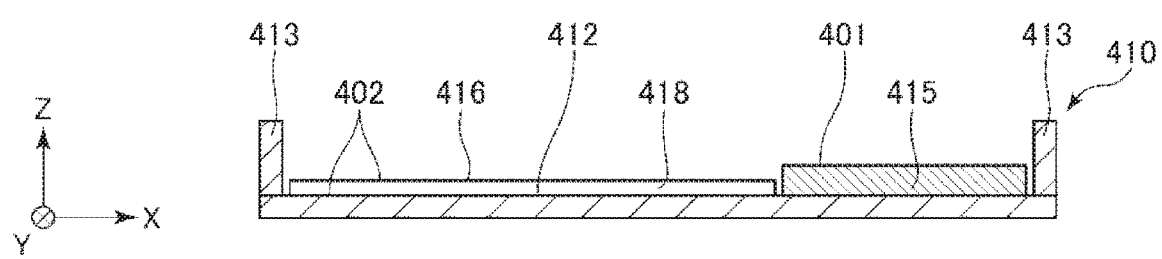
FIG. 18 is a modified example of FIG. 16.

On the other hand, FIG. 17 is the modified example of FIG. 15. FIG. 18 is the modified example of FIG. 16.

In the parts container unit 410 shown in FIGS. 17 and 18, the height of the upper surface of the first member 415 is higher than the height of the upper surfaces of the second members 416. Accordingly, the parts P thrown in the first planar portion 401, i.e., the upper surface of the first member 415 may be moved to the second members 416 and the grooves 418 particularly easily by the shift action under their own weights of the parts P. Further, the parts P moved to the groove portion 402 are harder to be returned to the first planar portion 401 again. Thereby, the appearance ratio of the pickup posture may be easily increased.

Note that, as described above, the parts container unit 410 (object container unit) has the container 411, the first member 415 provided in the container 411, and the second members 416 provided in the container 411, and the above described first planar portion 401 is the region including the surface of the first member 415 and the above described groove portion 402 is the region including the surfaces of the second members 416. Further, the first member 415 and the second members 416 are detachably placed in the parts container area 412 as the bottom surface of the container 411. Thereby, the first member 415 and the second members 416 may be easily replaced according to the type of the parts P or wear and degraded conditions. As a result, the general versatility of the parts container unit 410 may be improved.

When the first member 415 and the second members 416 are undetachable, it is necessary to prepare the whole parts container unit 410 with respect to each type of parts P. Accordingly, cost and time are required for the manufacture of the parts container unit 410. When the type of parts P is changed, it is necessary to replace the whole parts container unit 410, and thereby, time and effort may be required for replacement work.

On the other hand, when the members are detachable, the first member 415 and the second members 416 are replaced with the container 411 remaining attached to respond the change of the type of parts P. Thereby, effort and time for the replacement work may be reduced and the cost of the parts container unit 410 may be reduced.

For example, as described above, in the parts container unit 410 (object container unit) according to the embodiment, the width W1 of the grooves 418 is variable. Thereby, the parts P to be located in the grooves 418 may be changed to various types. Accordingly, the general versatility of the parts container unit 410 may be improved and the cost of the parts container unit 410 may be reduced.

Particularly, in the embodiment, the parts container area 412 shown in the respective drawings has the rectangular shape and the first member 415 and the second members 416 also have the rectangular shapes. Accordingly, the first member 415 and the second members 416 may be placed in various combinations in the parts container area 412. As a result, the parts container unit 410 that easily responds to various variations with respect to the size, material, shape, etc. of the parts P may be realized.

As described above, the bottoms of the grooves 418 are located vertically below the first planar portion 401. Accordingly, the probability that the parts P are located within the grooves 418 is higher under their own weights. As a result, the appearance ratio of the pickup posture may be increased.

Further, the grooves 418 have the rectangular shapes as seen from the normal direction in which the normal of the first planar portion 401 extends, i.e., the plus side of the Z-axis. The grooves 418 have the constant width W1 over the entire lengths of the grooves 418. Accordingly, even when the parts P are located within the grooves 418, the parts P are movable along the X-axis. Thereby, the shift or back-shift of the parts P within the grooves 418 can be performed.

On the other hand, the section shape of the grooves 418 along Y-Z plane is appropriately set according to the type of the parts P and set to a rectangular shape, triangular shape, trapezoidal shape, semi-circular shape, or the like as examples.

2. Second Embodiment

Next, the second embodiment will be explained.

Figure 19:
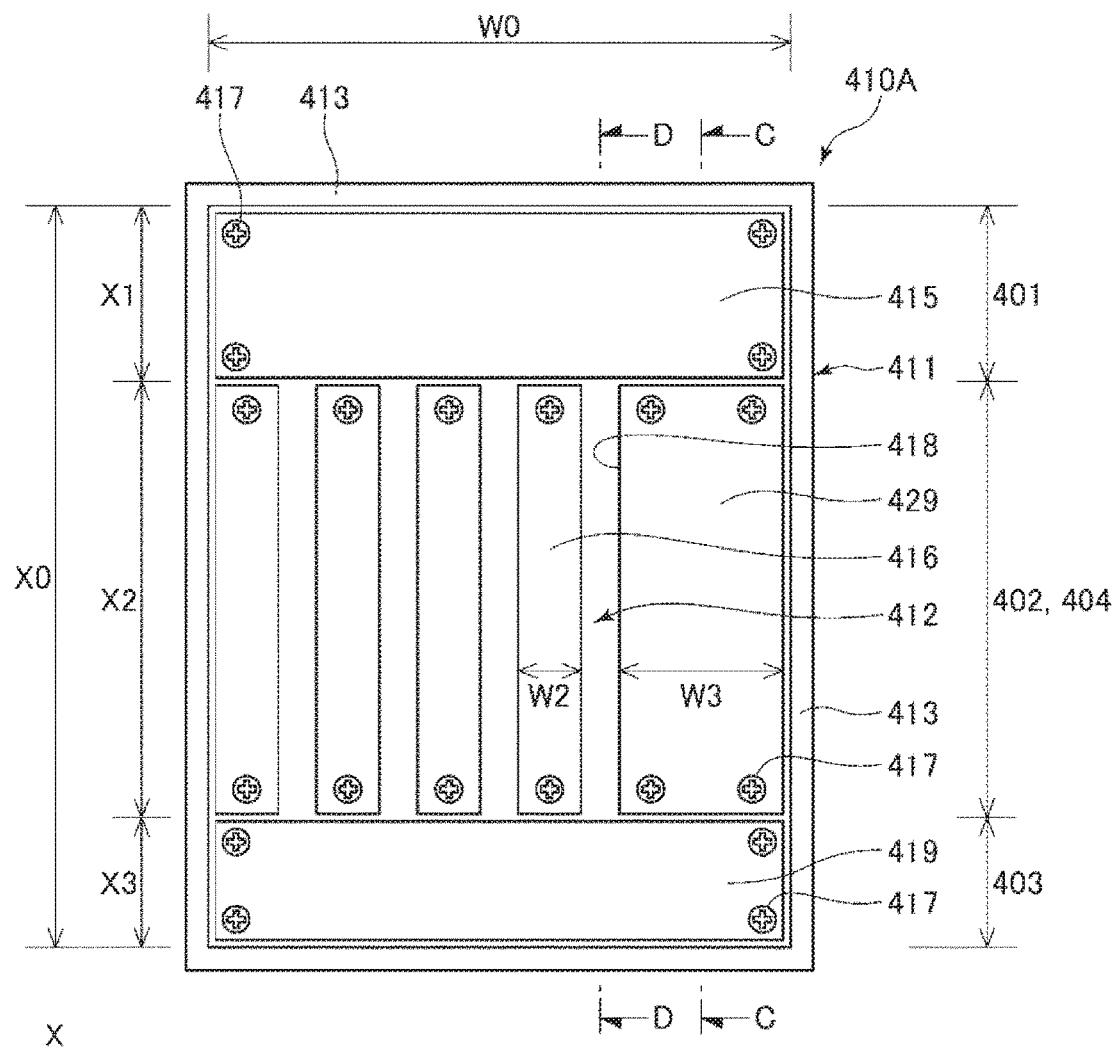
FIG. 19 is a plan view of a parts container unit provided in a robot system according to a second embodiment as seen from the plus side of the Z-axis.

FIG. 19 is the plan view of the parts container unit provided in the robot system according to the second embodiment as seen from the plus side of the Z-axis.

As below, the second embodiment will be explained, and the following explanation will be made with a focus on the differences from the first embodiment and the explanation of the same items will be omitted. Note that, in FIG. 19, the same configurations as those of the first embodiment have the same signs.

A parts container unit 410A shown in FIG. 19 has the container 411, and the first member 415, the plurality of second members 416, a third member 419, and a fourth member 429 held within the container 411.

The third member 419 is a plate-like member mounted in a portion at the minus side of the X-axis of the second members 416 of the parts container area 412. As shown in FIG. 19, the plan view shape of the third member 419 is a rectangular shape having a long axis parallel to the Y-axis. The length of the long side of the third member 419 is substantially equal to the length of the short side of the parts container area 412. On the other hand, a length X3 of the short side of the third member 419 is not particularly limited as long as the length is shorter than the length X0 of the long side of the parts container area 412, but preferably equal to or less than 50% of the length X0 and more preferably from 5% to 40%.

Note that the plan view shape of the third member 419 is not limited to that described as above, but may be any shape. Or, the third member 419 may be divided into a plurality of pieces.

The third member 419 is fixed to the parts container area 412 by screws 417. Therefore, the third member 419 may be easily detached from the parts container area 412 by loosening of the screws 417.

The fourth member 429 is a plate-like member mounted in a portion at the minus side of the Y-axis of the second members 416 of the parts container area 412. As shown in FIG. 19, the plan view shape of the fourth member 429 is a rectangular shape having a long axis parallel to the X-axis. The length of the long side of the fourth member 429 is substantially equal to the length of the long sides of the second members 416. On the other hand, a width W3 of the fourth member 429 is wider than the width W2 of the second members 416.

Note that the plan view shape of the fourth member 429 is not limited to that described as above, but may be any shape. Or, the fourth member 429 may be divided into a plurality of pieces.

The fourth member 429 is fixed to the parts container area 412 by screws 417. Therefore, the fourth member 429 may be easily detached from the parts container area 412 by loosening of the screws 417.

Figure 20:
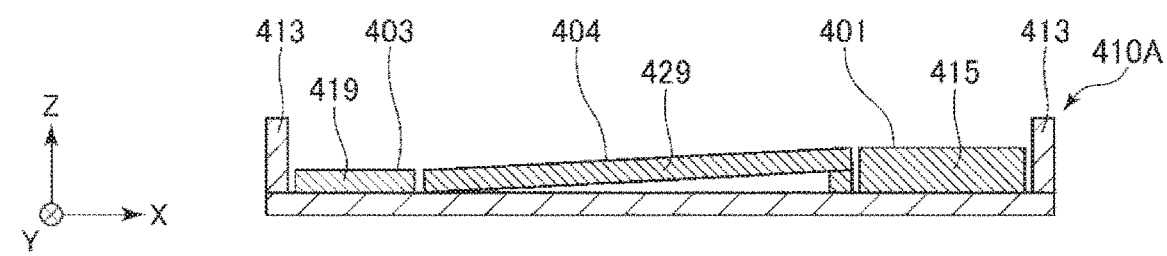
FIG. 20 is a sectional view along line C-C in FIG. 19.
Figure 21:
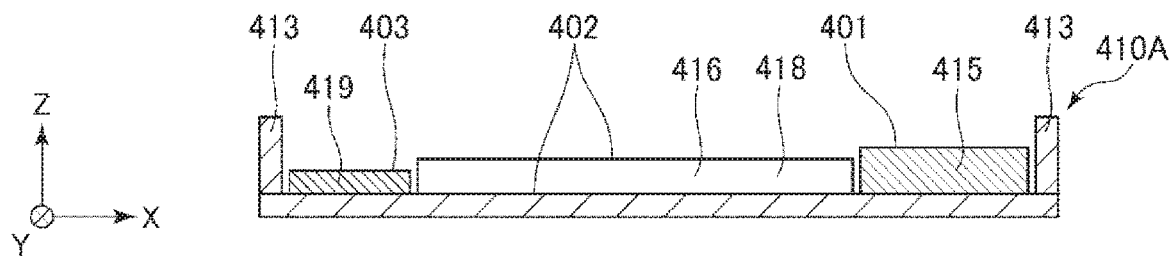
FIG. 21 is a sectional view along line D-D in FIG. 19.

FIG. 20 is the sectional view along line C-C in FIG. 19. FIG. 21 is the sectional view along line D-D in FIG. 19.

In the parts container unit 410A shown in FIG. 20, the height of the upper surface of the first member 415 is higher than the height of the upper surface of the third member 419. Further, the upper surface of the fourth member 429 is inclined to connect the upper surface of the first member 415 and the upper surface of the third member 419.

In the parts container unit 410A shown in FIG. 21, the height of the upper surfaces of the second members 416 is lower than the upper surface of the first member 415 and higher than the upper surface of the third member 419.

According to the above described third member 419, the parts container unit 410A has a second planar portion 403 in addition to the above described first planar portion 401 and groove portion 402 as regions in which the contained parts P are located. The second planar portion 403 is the region formed by the upper surface of the third member 419, i.e., the substantially planar surface. In other words, the second planar portion 403 includes the upper surface of the third member 419 as "second planar surface".

Further, the parts container unit 410A has an inclined portion 404 by the fourth member 429. The inclined portion 404 is a region formed by the upper surface of the fourth member 429 and connects the upper surface of the first member 415 and the upper surface of the third member 419.

The above described first planar portion 401, groove portion 402, second planar portion 403, and inclined portion 404 have the position relationships in the plan view.

First, the first planar portion 401, the groove portion 402, and the second planar portion 403 are sequentially arranged along the X-axis from the plus side of the X-axis toward the minus side of the X-axis. Further, the groove portion 402 and the inclined portion 404 are sequentially arranged along the Y-axis from the plus side of the Y-axis toward the minus side of the Y-axis.

Note that the arrangement of the groove portion 402 and the inclined portion 404 may be reversed to that described as above.

Next, the parts P moving within the parts container unit 410A in the pickup work of the parts P by the robot 100 will be explained.

Figure 22:
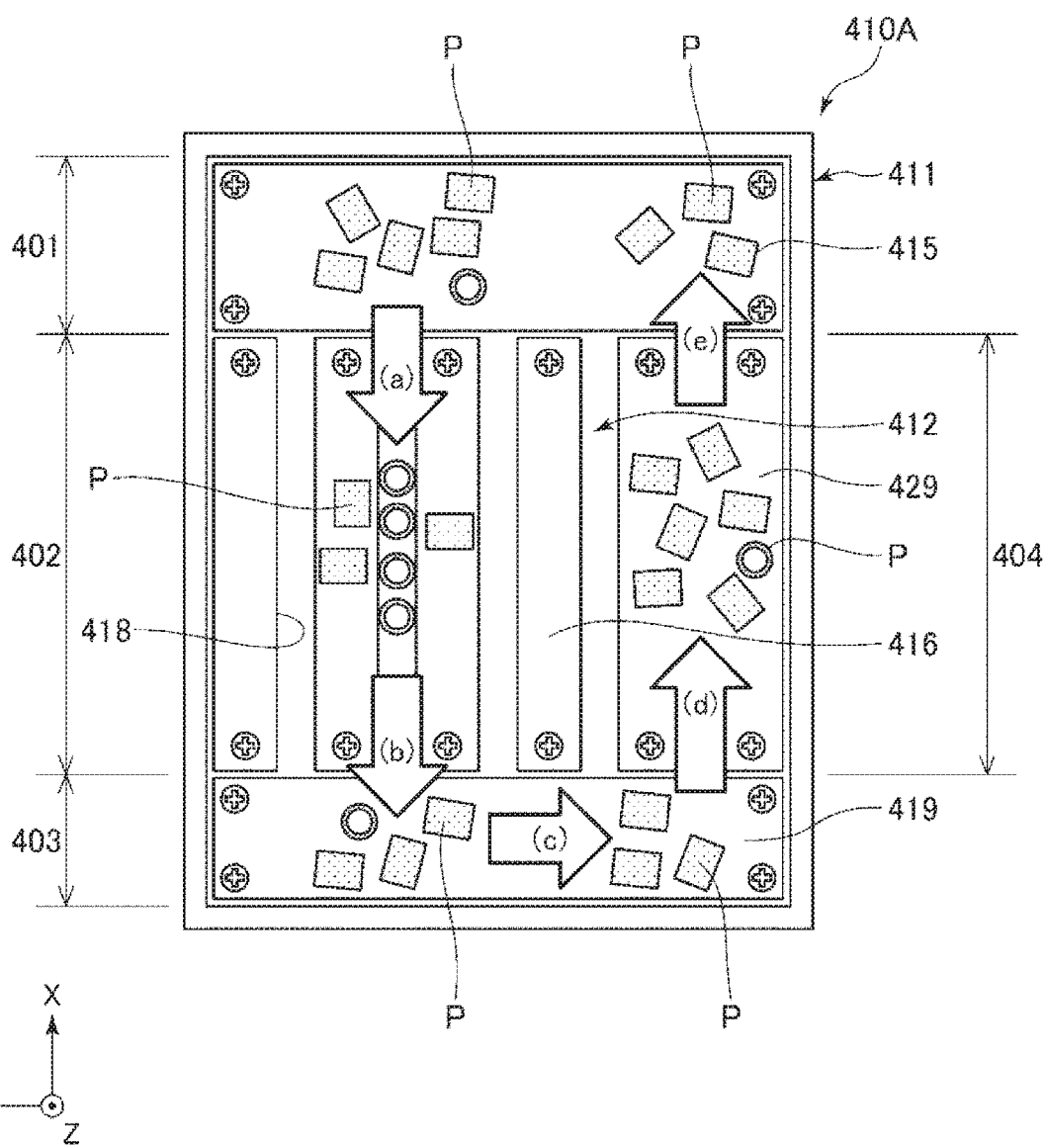
FIG. 22 is an explanatory diagram showing parts moving within the parts container unit in the pickup work of parts by the robot.

FIG. 22 is the explanatory diagram showing the parts P moving within the parts container unit 410A in the pickup work of the parts P by the robot 100.

When the parts P are thrown from the hopper (not shown), the parts are collected in a part of the first planar portion 401. Then, the parts P are moved to the groove portion 402 as shown by an arrow (a) in FIG. 22 by the shift action of the vibrator unit 420. At the time, the parts P once spread in the right and left directions in FIG. 22, and then, move to be widely distributed in the groove portion 402. Note that, in FIG. 22, to avoid complexity of the drawing, the parts P are shown only in a part of the groove portion 402.

Here, as shown in FIG. 21, the height of the groove portion 402 is lower than that of the first planar portion 401. Accordingly, the movement shown by the arrow (a) in FIG. 22 may be efficiently performed using their own weights of the parts P. Further, the movement opposite to the arrow (a) may be suppressed.

In the groove portion 402, the probability that the parts P are located within the grooves 418 is higher and the the appearance ratio of the pickup posture is increased. Thereby, the success rate of the pickup work is improved.

When the pickup work of the parts P taking the pickup postures in the groove portion 402 ends, the remaining parts P are moved to the second planar portion 403 as shown by an arrow (b) in FIG. 22 by the shift action of the vibrator unit 420.

Here, as shown in FIG. 21, the height of the second planar portion 403 is lower than the height of the upper surfaces of the second members 416 of the groove portion 402. Accordingly, the movement shown by the arrow (b) in FIG. 22 may be efficiently performed using their own weights of the parts P. Further, the movement opposite to the arrow (b) may be suppressed.

Note that the parts P may be located in both the first planar portion 401 and the groove portion 402 at the same time. In this case, the movement of the parts P shown by the arrow (a) and the movement of the parts P shown by the arrow (b) may be performed at the same time by the single shift action.

When the parts P move to the second planar portion 403, the movement is detected by image recognition processing on the image captured by the camera 430. Then, a control command 233 of a lateral shift action is transmitted to the vibrator unit 420. The lateral shift action is an action in a different direction from that of the above described shift action, and moves the parts P located in the second planar portion 403 toward the minus side of the Y-axis as shown by an arrow (c) in FIG. 22.

When the parts P are moved to an end portion of the second planar portion 403 at the minus side of the Y-axis, the movement is detected by the image recognition processing. Then, the parts P are moved to the inclined portion 404 as shown by an arrow (d) in FIG. 22 by the back-shift action of the vibrator unit 420. When the back-shift action is further continued, the parts P may be returned to the first planar portion 401 as shown by an arrow (e) in FIG. 22. The inclined portion 404 is provided, and thereby, the parts P can be moved vertically upward against the gravity.

Then, the parts P returned to the first planar portion 401 are moved to the groove portion 402 again and the pickup work is performed thereon.

In the above described manner, in the parts container unit 410A, the parts P may be circulated. Accordingly, a jam is harder to occur compared to the first embodiment. Thereby, the movement of the parts P may be smoother and a time loss in the pickup work may be suppressed.

As described above, the parts container unit 410 (object container unit) according to the embodiment has the second planar portion 403, and the groove portion 402 is located between the first planar portion 401 and the second planar portion 403 as seen from the normal direction in which the normal of the first planar surface included in the first planar portion 401 extends, i.e., the plus side of the Z-axis.

Thereby, the parts P moved from the first planar portion 401 to the groove portion 402 may be moved to the second planar portion 403. Here, the second planar portion 403 has the same configuration as the first planar portion 401. That is, the second planar portion 403 preferably includes the substantially planar second planar surface, but may have some irregularities. Accordingly, the parts P slide well in the second planar portion 403, and thus, even when the parts are not sufficiently distributed in the first planar portion 401, the parts can be distributed in the second planar portion 403.

Note that, in the embodiment, the parts P moved to the second planar portion 403 are controlled to be returned to the first planar portion 401 via the inclined portion 404, however, the inclined portion 404 may be omitted. In this case, the parts P moved to the second planar portion 403 may be distributed while being returned by the back-shift action. The second planar portion 403 contributes to a more uniform distribution.

Further, as described above, the width W3 of the fourth member 429 is wider than the width W2 of the second members 416. Thereby, the width of the inclined portion 404 may be secured to be wider and dropping of the parts P from the inclined portion 404 may be suppressed in the movement along with the arrows (d), (e).

Specifically, the width W3 is preferably from 1.1 times to 10 times the width W2 and more preferably from 1.5 times to 5.0 times.

On the other hand, when the width of the parts container area 412 is W0, the width W3 is preferably from 5% to 50% of the width W0 and more preferably from 10% to 40%. Thereby, the balance between the width of the groove portion 402 and the width of the inclined portion 404 may be optimized and dropping of the parts P from the inclined portion 404 may be suppressed with higher efficiency of the pickup work.

In the above described second embodiment, the same effects as those of the first embodiment may be obtained.

3. Third Embodiment

Next, the third embodiment will be explained.

Figure 23:
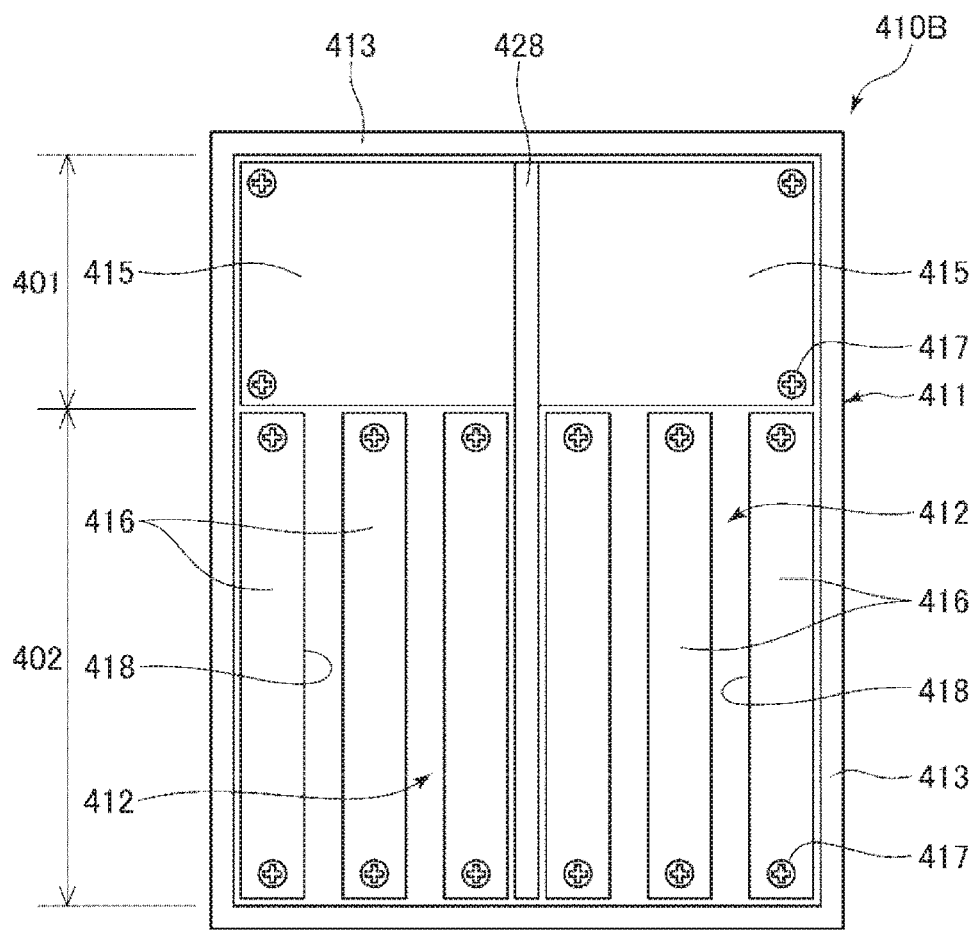
FIG. 23 is a plan view of a parts container unit provided in a robot system according to a third embodiment as seen from the plus side of the Z-axis.

FIG. 23 is the plan view of the parts container unit provided in the robot system according to the third embodiment as seen from the plus side of the Z-axis.

As below, the third embodiment will be explained, and the following explanation will be made with a focus on the differences from the first embodiment and the explanation of the same items will be omitted. Note that, in FIG. 23, the same configurations as those of the first embodiment have the same signs.

A parts container unit 410B shown in FIG. 23 is the same as the parts container unit 410 shown in FIG. 4 except that a partition portion 428 is further provided. That is, the parts container unit 410B (object container unit) shown in FIG. 23 has the partition portion 428 extending along a direction toward the minus side of the X-axis (first direction) and partitioning the first planar portion 401 and the groove portion 402.

The partition portion 428 is provided, and thereby, the first planar portion 401 may be divided in the right and left sections in FIG. 23. Similarly, the groove portion 402 may be divided in the right and left sections in FIG. 23. Thereby, different types of parts can be thrown in the right and left sections of the first planar portion 401. As a result, for example, the pickup postures may appear at the same time with respect to two types of parts in the same time taken for the shift action, the back-shift action, and the flip action. Thus, the two types of parts may be sequentially picked up by the robot 100 and the takt time may be shortened.

Note that, when the types of parts are different, the widths of the grooves 418 may be different, and accordingly, the widths of the grooves 418 may be made different between the right and left sections of the partition portion 428 in the groove portion 402.

In the above described third embodiment, the same effects as those of the first embodiment may be obtained.

As above, the feeder and robot system according to the present disclosure are explained based on the illustrated embodiments. The present disclosure is not limited to those, but configurations of the respective units may be replaced by any configurations having the same functions. Further, any other configurations may be added to the above described embodiments of the feeder and robot system.

What is claimed is:

1. A feeder that feeds objects to be picked up by a robot, comprising:
an object container unit having a first planar portion including a first planar surface in which the objects are thrown, and a groove portion including a plurality of grooves extending in a first direction from the first planar portion as seen from a normal direction in which a normal of the first planar surface extends; and
a vibrator unit that applies vibration to the object container unit,
wherein the vibrator unit has a first vibration mode in which the objects are moved in the first direction,
wherein the object container unit has a container, a first member provided in the container, and a second member provided in the container,
the first planar portion includes a surface of the first member,
the groove portion includes a surface of the second member, and
the first member and the second member are detachably placed on a bottom surface of the container.

2. The feeder according to claim 1, wherein
in the object container unit, widths of the grooves are variable.

3. The feeder according to claim 1, wherein
the object container unit has a second planar portion including a second planar surface, and
the groove portion is located between the first planar portion and the second planar portion as seen from the normal direction.

4. The feeder according to claim 1, wherein
bottoms of the grooves are located vertically below the first planar portion.

5. The feeder according to claim 1, wherein
the object container unit has a partition portion extending along the first direction and partitioning the first planar portion and the groove portion.

6. The feeder according to claim 1, wherein
the grooves have rectangular shapes as seen from the normal direction.

7. The feeder according to claim 1, wherein
the vibrator unit has a second vibration mode in which the objects are moved in a second direction opposite to the first direction.

8. A robot system comprising:
the feeder according to claim 1; and
a robot having an end effector that picks up the objects contained in the object container unit.

9. The robot system according to claim 8, further comprising an imaging unit that images the objects contained in the object container unit, wherein
when a predetermined number or more of the objects located in the groove portion are detected by an image captured by the imaging unit, the vibrator unit applies vibration to the object container unit in a second vibration mode in which the objects are moved in the second direction opposite to the first direction.

* * * * *